(12) United States Patent
Tweedt et al.

(10) Patent No.: US 11,753,144 B2
(45) Date of Patent: Sep. 12, 2023

(54) UNDUCTED PROPULSION SYSTEM

(71) Applicant: General Electric Company, Schenectady, NY (US)

(72) Inventors: Daniel L. Tweedt, West Chester, OH (US); Syed Arif Khalid, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/503,195

(22) Filed: Oct. 15, 2021

(65) Prior Publication Data
US 2023/0124580 A1    Apr. 20, 2023

(51) Int. Cl.
*B64C 11/48*    (2006.01)
*F01D 9/02*    (2006.01)

(52) U.S. Cl.
CPC ............... *B64C 11/48* (2013.01); *F01D 9/02* (2013.01); *F05D 2220/323* (2013.01); *F05D 2220/325* (2013.01)

(58) Field of Classification Search
CPC ..... B64C 11/00; B64C 11/001; B64C 11/003; B64C 11/46; B64C 11/48; F01D 9/00; F01D 9/02; F02C 6/206; F02C 7/042; F02K 3/02; F02K 3/025; F05D 2220/323; F05D 2220/324; F05D 2220/325
See application file for complete search history.

(56) References Cited

U.S. PATENT DOCUMENTS 2,934,150 A  *  4/1960  Fink ..................... B64C 11/14
                                                    416/239
3,134,561 A       5/1964  Deodat
(Continued)

FOREIGN PATENT DOCUMENTS

| EP | 0846867 B1 | 2/2003 |
| EP | 3683403 A1 | 7/2020 |
| EP | 2778343 B1 | 8/2020 |

OTHER PUBLICATIONS

Airbus; "A400M, Delivery to the point of need"; < http://web.archive.org/web/20210812110334/https://www.airbus.com/defence/a400m.html >; Jul. 26, 2021; pp. 1-8.
(Continued)

*Primary Examiner* — Justin D Seabe
*Assistant Examiner* — Sang K Kim
(74) *Attorney, Agent, or Firm* — Fitch, Even, Tabin & Flannery LLP

(57) ABSTRACT

Apparatuses and systems are provided herein for unducted propulsion systems. The system includes a forward housing for high efficiency for high subsonic sustained flight. A plurality of blades are affixed to the forward housing, wherein the forward housing defines a flowpath curve extending from the forward-most end of the forward housing through the axial extent of a forward blade root. The flowpath curve is described by an axial direction parallel to an axis of rotation and a radius from the axis of rotation. The flowpath curve includes a first point having a first radius where the radius reaches a maximum forward of the forward blade root and a second point aft of the first point having a second radius where the radius stops decreasing. The ratio of the first radius to the second radius is greater than or equal to 1.029.

27 Claims, 13 Drawing Sheets

(56) References Cited

U.S. PATENT DOCUMENTS

| | | | |
|---|---|---|---|
| 4,171,183 A | 10/1979 | Cornell | |
| 4,446,696 A | 5/1984 | Sargisson | |
| 4,486,146 A | 12/1984 | Campion | |
| 4,765,135 A | 8/1988 | Lardellier | |
| 4,930,725 A | 6/1990 | Thompson | |
| 5,079,916 A | 1/1992 | Johnson | |
| 5,275,531 A | 1/1994 | Roberts | |
| 5,402,638 A | 4/1995 | Johnson | |
| 6,017,186 A | 1/2000 | Hoeger | |
| 6,938,854 B2 | 9/2005 | Nelson | |
| 7,186,079 B2 | 3/2007 | Suciu | |
| 8,864,062 B2 | 10/2014 | Karem | |
| 8,967,967 B2 | 3/2015 | Stretton et al. | |
| 9,017,028 B2 | 4/2015 | Fabre | |
| 9,242,721 B2 | 1/2016 | Neuteboom | |
| 9,340,277 B2 | 5/2016 | Breeze-Stringfellow | |
| 9,387,923 B2 | 7/2016 | Stretton | |
| 9,464,526 B2 | 10/2016 | Cellier | |
| 9,598,981 B2 | 3/2017 | Salunkhe | |
| 9,776,707 B2 | 10/2017 | Louet | |
| 10,087,885 B2 | 10/2018 | Kohlenberg | |
| 10,202,865 B2 | 2/2019 | Breeze-Stringfellow | |
| 10,358,926 B2 | 7/2019 | Tweedt | |
| 10,399,664 B2 | 9/2019 | Bowden | |
| 10,414,486 B2 | 9/2019 | Wood | |
| 10,556,699 B2 | 2/2020 | Pautis | |
| 10,584,641 B2 | 3/2020 | Escure et al. | |
| 10,618,633 B1* | 4/2020 | Johnston | B64D 29/00 |
| 10,669,881 B2 | 6/2020 | Breeze-Stringfellow | |
| 10,704,410 B2 | 7/2020 | Zatorski | |
| 10,710,705 B2 | 7/2020 | Tweedt | |
| 10,899,447 B2 | 1/2021 | Hernadi | |
| 10,907,495 B2 | 2/2021 | Breeze-Stringfellow et al. | |
| 11,021,230 B2 | 6/2021 | Binder | |
| 11,300,003 B2 | 4/2022 | Breeze-Stringfellow | |
| 11,401,824 B2 | 8/2022 | Breeze-Stringfellow | |
| 2011/0194932 A1 | 8/2011 | Zanenga | |
| 2013/0343892 A1* | 12/2013 | Stretton | F01D 5/145 |
| | | | 416/201 R |
| 2016/0333734 A1* | 11/2016 | Bowden | F01D 9/041 |
| 2017/0284303 A1* | 10/2017 | Johnson | F02C 7/18 |
| 2019/0359315 A1 | 11/2019 | Binder | |
| 2021/0108572 A1 | 4/2021 | Arif | |
| 2021/0108595 A1 | 4/2021 | Arif | |
| 2022/0055759 A1* | 2/2022 | Czarnik | B64D 27/24 |

OTHER PUBLICATIONS

Banez, Vicente, et al.; "Case Study of the Installation of the A400M Engine Control Unit"; 8th European Conference for Aeronautics and Space Sciences (EUCASS); 2019; <https://www.eucass.eu/doi/EUCASS2019-0965.pdf>; 10 pages.
U.S. Appl. No. 17/503,184, filed Aug. 2, 2022, Syed Arif Khalid.
U.S. Appl. No. 17/665,483, filed Feb. 4, 2022, Daniel L. Tweedt.
French Application No. FR2112278, filed Nov. 19, 2021, Title: Module for Assembling a Fan Blade of a Turbomachine.
French Application No. FR2109526, filed Sep. 10, 2021, Title: Flexibilities in a geared gas turbine engine.
French Application No. FR2109530, filed Sep. 10, 2021, Title: Flrxibilities in a gas turbime engine.
French Application No. FR2109787, filed Sep. 17, 2021, Title: Aircraft Turbine Engine With an Off-Axis Propeller.
French Application No. FR2112280, filed Nov. 19, 2021, Title: Assembly With Variable Setting for a Fan of a Turbomachine.
French Application No. FR2112486, filed Nov. 25, 2021, Title: Electric Energy Conversion and Transport System for the Internal Hybridization of an Aircraft Turbo-Engine.
French Application No. FR2112509, filed Nov. 25, 2021, Title: Device for Pressurizing a Turbomachine Enclosure With a Curvic Coupling Passage, and Corresponding Turbomachine.
French Application No. FR2112705, filed Nov. 30, 2021, Title: Turbomachine Comprising a Lubrication Enclosure and a Speed Reducer.
French Application No. FR2112869, filed Dec. 2, 2021, Title: Turbine engine comprising an electric machine downstream from a turbine shaft and driven by this shaft.
French Application No. FR2112100, filed Dec. 7, 2021, Title: Cooling-air distribution case.
French Application No. FR2113361, filed Dec. 13, 2021, Title: Turbomachine for an Aircraft Comprising an Electric Machine.
French Application No. FR2113552, filed Dec. 15, 2021, Title: Method for managing the torque of a turbomachine.
French Application No. FR2113845, filed Dec. 17, 2021, Title: Aircraft Turbomachine.
French Application No. FR2113847, filed Dec. 17, 2021, Title: Aircraft Turbomachine.
French Application No. FR2113949, filed Dec. 20, 2021, Title: Turbomachine Module Equipped With a Pitch Change System and a FLuid Transfer Device.
French Application No. FR2113951, filed Fec. 20, 2021, Title: Turbomachine Module Eqqipped With Variable Pitch Vanes and an Annular Interface Shroud.
French Application No. FR2113952, filed Dec. 20, 2021, TitleL Turbomachine Module Equipped With Variable Pitch Vanes and Oil Transfer Device.
French Application No. FR2113953, filed Dec. 20, 2021, Title: Turbomachine Module Equipped With a Pitch Change System and a Fluid Transfer Device With Blind Sleeving.
French Application No. FR2113966, filed Dec. 20, 2021, Title: Fluid Transfer Device With Hydraulic and Mechanical Connection Means.
French Application No. FR21114236, filed Dec. 22, 2021, Title: Turbine Engine Subassembly Including a Gooseneck With an Improved Configuration and Turbine Engine Including a Subassembly of This Type.
French Application No. FR2114272, filed Dec. 22, 2021, Title: Aircraft Turbine Engine Comprising Blade Pitch Control Using Lical Pressure Meassurements, Ref. B-024494).
French Application No. FR2200883, filed Feb. 1, 2022, Title: Method for managing the torque of a turbomachine, (Ref. B-025105).
French Application No. FR2201260, filed Feb. 14, 2022, Title: Propulsion unit for aircraft comprising a gas turbine engine and an electrical machine mounted in an enclosure with a cooling system comprising a main coupling member, method for using such a unit, (Ref. B-025173).
French Application No. FR2201266, filed Feb. 14, 2022, Title: Gas turbine engine assembly comprising a housing with half-shells bearing variable pitch inlet stator vanes, (Ref. B-024190)
French Application No. FR2202171, filed Mar. 11, 2022, Title: Propulsion System for an Aircraft, (Ref. B-025595).
French Application No. FR2202172, filed Mar. 11, 2022, Title: Aeronautical Thruster, (Ref. B-025596).
Perry, Dominic; "EPI sets mid-2017 target for TP400 engine fix"; Aug. 2, 2016; Flight Global; <https://www.flightglobal.com/epi-sets-mid-2017-target-for-tp400-engine-fix/121390.article>; 2 pages.
USPTO; U.S. Appl. No. 17/503,184; Notice of Allowance dated Oct. 4, 2022; (14 pages).

\* cited by examiner

UNDUCTED PROPULSION SYSTEM

TECHNICAL FIELD

The technology relates generally to an unducted propulsion system.

BACKGROUND

Generally, a fan of an aircraft propulsion system produces thrust by accelerating air passing through the fan. Factors that are detrimental to efficiency of thrust production include losses in energy in air as it enters and passes through the fan, velocity contributions that do not contribute to thrust (such as swirl and vortices in the air leaving the fan), frictional drag forces on external surfaces of an aircraft propulsion system, and shockwave-related drag forces (e.g., wave drag) on external surfaces of the aircraft propulsion system. Thus, for an aircraft propulsion system, the goal is to generate a given amount of thrust without requiring excessive input power to the fan. As such, it is desirable to minimize inefficiency in the production of thrust.

BRIEF DESCRIPTION OF THE DRAWINGS

Disclosed herein are embodiments of systems and apparatuses pertaining to an unducted propulsion system. This description includes drawings, wherein.

Figure 1:
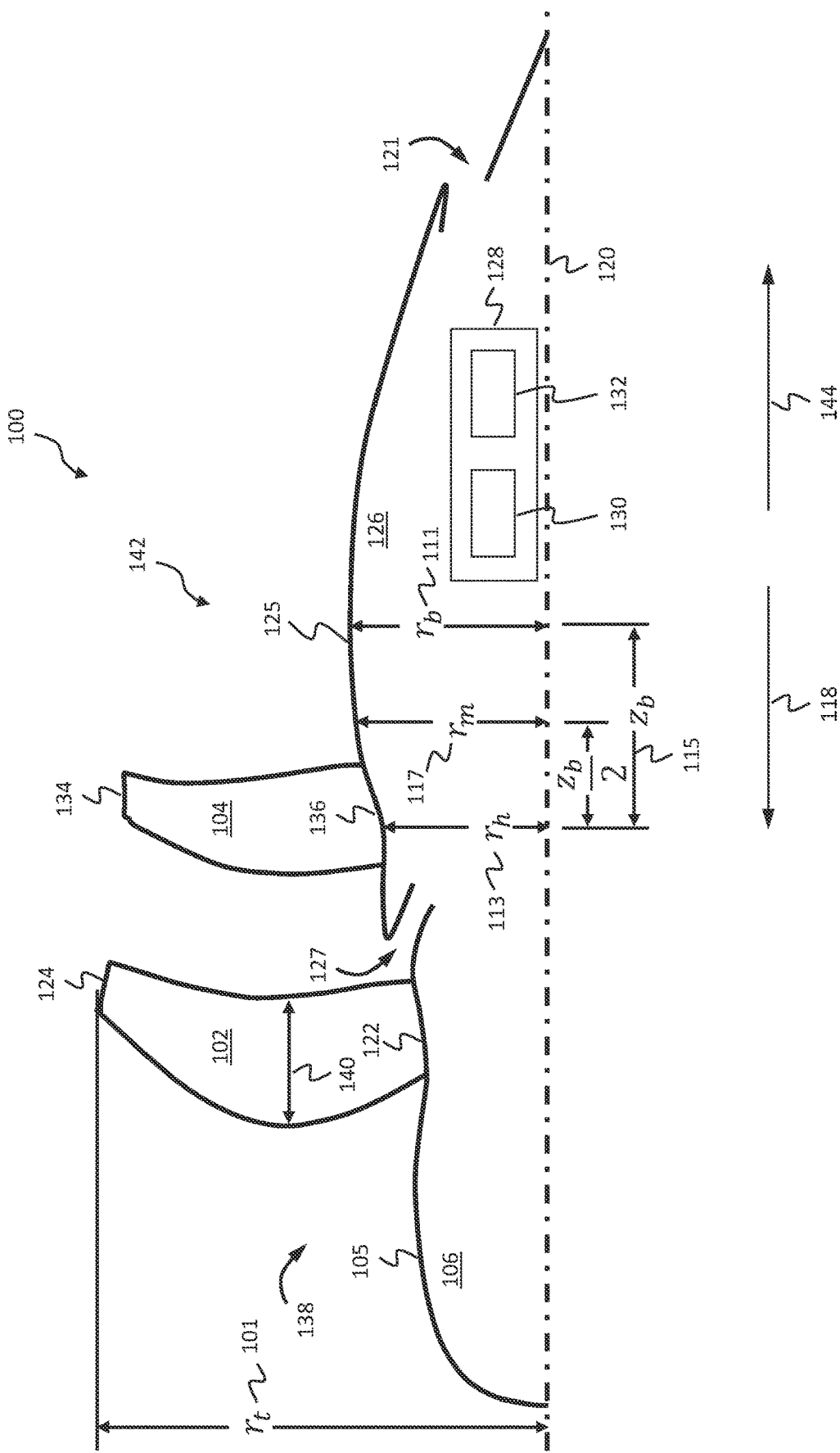
FIG. 1 shows an elevational cross-sectional view of an exemplary unducted propulsion system having an axis of rotation, forward and aft blade assemblies, forward and aft housings, engine inlet and engine exit, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Elevational cross-sectional views of an unducted propulsion system in the figures depict external flowpath curves formed by the intersection of the external surface of the housings with a plane that includes the axis of rotation. Such cross-sectional views also indicate structures such as blades that facilitate understanding of the embodiments of the present disclosure. Limiting the section view to a single side of the axis of rotation does not imply that the system is axisymmetric about the axis of rotation. The cross-sectional views are used to illustrate certain characteristics, for example the shape of a housing associated with a blade assembly. Also, the drawings omit certain details in the system not needed to fully appreciate certain aspects of the system. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Aspects and advantages of the present disclosure will be set forth in part in the following description, or may be obvious from the description, or may be learned through practice of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine exit or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The term "propulsive system" refers generally to a thrust-producing system, which thrust is produced by a propulsor, and the propulsor provides said thrust using an electrically-powered motor(s), a heat engine such as a turbomachine, or a combination of electric motor(s) and turbomachine.

The term "housing" refers to a casing that encloses a propulsion system and provides an aerodynamic exterior. A housing may be comprised of or include a hub, spinner and nacelle. In addition, a housing may be either rotating about the axis of rotation or stationary, or segmented axially so that a portion is rotating while another portion is stationary.

The singular forms "a", "an", and "the" include plural references unless the context clearly dictates otherwise.

For a flowpath curve corresponding to a housing external surface, axial direction, "z", is parallel to the axis of rotation and radius, "r", is the distance from the axis of rotation. And an z-r plane is located by an angular coordinate theta (i.e., cylindrical coordinate system is adopted, where the coordinate theta precisely locates the orientation of an z-r plane in 3D space). Because the housing external surface may not be axisymmetric about the axis of rotation, the shape of the flowpath curve may depend on the z-r plane used to define it. In the specification and claims, in addition to stipulating that it includes the axis of rotation, a z-r plane used to define the flowpath curve also includes a point on a blade root within the blade assembly nearest to or associated with the housing described by the curve. Furthermore, for any axial location, z, along the curve for which a housing is rotating about the axis of rotation, rather than referring to a radius on the flowpath curve at a specified z-r position with respect to the axis of rotation, the radius, r, is an "effective" radius for a housing cross-sectional area perpendicular to the axis of rotation at that axial, z, location. Thus, for axial locations where the housing is rotating, radius, r, is the radius of a circle having the same cross-sectional area of the housing in a planar section perpendicular to the axis of rotation.

The term "bulge" refers to the location on the flowpath curve where, proceeding along the curve away from the nearest/associated blade assembly (i.e., forward of the forward blade assembly for the forward housing and the aft of the aft blade assembly for the aft housing), the radius reaches a maximum.

The term "local minimum" refers to the first location on the segment of the flowpath curve, proceeding from the bulge toward and through the axial extent of the associated blade root, where the radius stops decreasing. If the radius monotonically decreases from the bulge through the axial extent of the associated blade root, then the local minimum is at the location on the segment of the flowpath curve farthest from the bulge. Thus, the local minimum is the nearest minimum radius location to the maximum radius location that is also within the axial extent of the blade root or between the blade root and the maximum radius location. It is understood that any gaps or steps in the flowpath curve arising from connecting, mating, or relative motion between components of the housing are ignored when determining the local minimum.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The technology described herein relates to an unducted propulsion system, particularly the shape an external surface of one or more housings encasing a propulsion system, for which housings can be comprised of a spinner, hub and/or nacelle.

A turbofan engine operates on the principle that a central gas turbine core drives a bypass fan, the fan being located at a radial location between a fan duct and the engine core. An unducted propulsion system instead operates on the principle of having the bypass fan located outside of the engine nacelle. This permits the use of larger fan blades able to act upon a larger volume of air than for a turbofan engine, and thereby improves propulsive efficiency over conventional engine designs.

Unducted propulsion systems may take the form of a propeller system, as used on a wide range of aircraft, e.g., radio controlled model airplanes, drones, piston engine propeller aircraft, turboprop regional aircraft, and large turboprop military transports. Another type of unducted propulsion system, sometimes referred to as "open rotor", consists of two blade assemblies, one in a forward position and one in an aft position, in which at least one of them rotates about an axis to deliver power to the propulsive stream that generates thrust. Such two blade assembly systems offer some advantages, but also some challenges and are far less common than single blade row systems. As used herein, the term "propeller" may refer to the single blade assembly of an unducted propulsion system or the forward blade assembly of an unducted propulsion system comprised of two blade assemblies. The term "fan" may refer to the either a propeller or both blade assemblies of an unducted propulsion system.

According to the disclosure, an unducted propulsion system can enable high subsonic cruise flight speed. Cruise is a phase of the flight that occurs when the aircraft levels to a set altitude after a climb and before it begins to descend. Thus, as used herein, cruise represents a continuous, high speed, and stable condition of flight for which an aircraft is intended to operate. This description is to distinguish cruise from certain conditions that are abnormal or transient, such as dive, in which the aircraft can reach high flight speeds, but the aircraft is not intended to experience for a substantial portion of the mission from takeoff to landing.

An unducted propulsion system that enables highest subsonic cruise flight can have two blade assemblies positioned in aerodynamic relationship to one another. As used herein "aerodynamic relationship" means they are positioned such that one is downstream of the other so at least a portion of the air acted upon by the forward blade assembly is subsequently acted upon by the aft blade assembly. This allows the tangential velocity, also known as swirl, imparted to the air by the forward blade assembly to be counteracted, i.e., at least partially canceled, by the change in tangential velocity imparted by the aft blade assembly. At least one of the blade assemblies is a rotating assembly carrying an array of airfoil blades that rotate about an axis of rotation and are located outside the engine nacelle. The other blade assembly may be another rotating blade assembly (rotor) or it may be a stationary blade assembly (stator). Without the aft blade assembly to cancel the swirl of the forward blade assembly, the high power per unit frontal or annular fan area required for high speed flight would leave excessive swirl in the air that passes through the unducted propulsion system, resulting in poor efficiency in producing thrust. For this reason, single propeller propulsion systems, such as propellers on turboprop engines, typically power aircraft that do not exceed a cruise Mach number of 0.72.

If the unducted propulsion system is comprised of two blade assemblies that are both rotors, the blades of the forward and aft blade assemblies are arranged to rotate about a common axis in opposing directions and are axially spaced apart along that axis. For example, the respective blades of the forward rotor assembly and aft rotor assembly may be co-axially mounted and spaced apart, with the blades of the forward rotor assembly configured to rotate clockwise about the axis and the blades of the aft rotor assembly configured to rotate counter-clockwise about the axis (or vice versa).

If one of the two blade assemblies is a stator, this blade assembly does not rotate about an axis and is placed either aerodynamically upstream or downstream of the rotating blade assembly, being the forward or aft blade assembly, respectively. If placed aerodynamically upstream of the rotating blade assembly, the stationary blade assembly imparts tangential velocity to the air in the direction opposite to the direction of rotor rotation, referred to as counter-swirl. Because of the direction of rotation, the aft rotating blade assembly imparts a change in tangential velocity to the air to reduce the magnitude of the tangential velocity of the air that passes through it. If positioned aerodynamically downstream of the rotating blade assembly, the stationary blade assembly imparts a change in tangential velocity that is opposite to the direction of tangential velocity imparted by the rotor, referred to as de-swirl. By de-swirling the air that it receives from the rotating blade assembly, the aft blade assembly reduces the magnitude of the tangential velocity of the air that passes through it. The blades in a stator are often referred to as "vanes". However, the general term "blade" and "blade assembly" are used herein to be used in either a rotating blade assembly or stationary blade assembly.

For a stationary blade assembly, the aircraft structure may be intermingled, integrated, or merged with the blade assembly. For example, the pylon used to mount an engine to an aircraft may occupy some of the same axial extent along the rotating blade assembly axis of rotation as at least some of the blades in the stationary blade assembly. Also, portions of the aircraft structure may be designed to serve the purpose of counter-swirl for a forward blade assembly or de-swirl for an aft blade assembly. Thus, aircraft structures may augment or even replace some blades in a stationary blade assembly.

As used herein, the locations or coordinates indicated by distance parallel to the axis of rotation and perpendicular to the axis of rotation define the external flowpath surfaces of the indicated structure. The external flowpath surfaces work with the blade assemblies to affect the flow of the working fluid, typically air, through the fan. The external flowpath surfaces formed by one or more housings separate the air stream accelerated by the fan from internal mechanisms, machinery, or equipment associated with the propulsion system. As the flight Mach number and acceleration of air through the fan increase, the shapes of these external flowpath surfaces become increasingly important to avoid high pressure loss or drag. In addition, these external flowpath surfaces may bulge, i.e., increase in size, axially away from the vicinity of the blade assembly to accommodate above-mentioned internal items.

For an unducted propulsion system, high speed flight requires even higher velocity through the fan and over the flowpath surfaces formed by the one or more housings. As used herein, "fan stream" is the fluid stream accelerated by the fan to produce thrust. Such velocities may reach or exceed the speed of sound, or Mach 1. Under certain conditions, high Mach flows generate dramatic increases in pressure loss and drag, penalizing the thrust producing performance, or efficiency, of the system. This may lead to poor fuel efficiency. Also, it may be desirable to limit the diameter of the fan to avoid penalties associated with weight, drag, and installation on an aircraft. However, a compact fan results in high thrust per unit frontal, or annular, area of the fan and, thus, higher acceleration than if the fan diameter were not so constrained. Furthermore, axial length of the system, and thus, the length of the flowpath surfaces that bound the fan stream, contributes to drag and weight. At the same time, reducing the axial length can also penalize performance of the unducted propulsion system by causing high magnitudes of flowpath surface curvatures, resulting in regions of high Mach number. Accordingly, it is desirable to provide an unducted propulsion system with an external flowpath shape of a housing upstream of and within the axial extent of a forward blade assembly that enables the aircraft to fly at high subsonic speeds with good efficiency and with transonic flow within the fan. It is also desired to provide an unducted propulsion system with an external flowpath shape of a housing downstream of and within the axial extent of an aft blade assembly that enables the aircraft to fly at high subsonic speeds with low loss and drag.

According to the disclosure, an unducted propulsion system for a subsonic aircraft having a cruise Mach number, $M_0$, 0.74 or greater, for example, $0.74<M_0<0.86$ or between cruise Mach number 0.78 and 0.84, has of an axis of rotation, a forward blade assembly, an aft blade assembly, a forward housing, and an aft housing. The forward and aft blade assemblies each include a plurality of blades, each blade having a root proximal to the axis of rotation and a tip distal from the axis of rotation. A flowpath curve corresponds to the intersection of the aft housing external surface with a plane containing the axis of rotation and the aft-most point of an aft blade root. For the flowpath curve, axial direction, z, is parallel to the axis of rotation, increasing in the aft or downstream direction. For the flowpath curve, radial coordinate, r, is distance from the axis of rotation.

The flowpath curve has a bulge and local minimum. The bulge location with radius $r_b$ is found by proceeding aft from the aft-most point of an aft blade root to where the radius reaches a maximum. The local minimum location with radius $r_h$ is found by proceeding axially forward from the bulge to where the radius stops decreasing. The flowpath curve has ratio $r_b/r_h>1.08$. Furthermore, the axial distance $z_b$ between the bulge and the local minimum may conform to the ratio $z_b/r_h<2.41$. Additionally, the flowpath curve may have a location with radius $r_m$ axially halfway between the bulge and the local minimum such that $(r_m/r_h-1)/(r_b/r_h-1)>0.59$. The above ratios may be tailored to suit a predetermined cruise Mach number, $M_0$, as shown in EQS. 1, 2, and 3 presented sequentially below:

$$\frac{r_b}{r_h} = (A1-1)\frac{M_0 - 0.60}{0.19} + 1 \quad \text{[EQ. 1]}$$

$$\frac{z_b}{r_h} = B1\left(\frac{M_0}{0.79}\right)^3 \quad \text{[EQ. 2]}$$

$$\frac{r_m/r_h - 1}{r_b/r_h - 1} = C1 \quad \text{[EQ. 3]}$$

In the above equations, $0.74 < M_0 < 0.86$, and constants A1, B1, and C1 have ranges $1.11 < A1 < 1.31$, $1.23 < B1 < 1.63$, and $0.59 < C1 < 0.79$. The above relationships for a flowpath curve corresponding to an aft blade root may apply to flowpath curves associated with multiple aft blade roots, or the flowpath curves associated with all aft blade roots.

According to the disclosure, an unducted propulsion system for a subsonic aircraft having a cruise Mach number, $M_0$, 0.74 or greater, for example $0.74 < M_0 < 0.86$, has an axis of rotation, a forward blade assembly, an aft blade assembly, a forward housing, and an aft housing. The forward and aft blade assemblies each include a plurality of blades, each blade having a root proximal to the axis of rotation and a tip distal from the axis of rotation. A flowpath curve corresponds to the intersection of the forward housing external surface with a plane containing the axis of rotation and the forward-most point of a forward blade root. For the flowpath curve, axial direction, z, is parallel to the axis of rotation, increasing in the forward or upstream direction. For the flowpath curve, radius, r, is distance from the axis of rotation. At axial locations where the forward housing is rotating about the axis of rotation (e.g., a spinner), radius, r, is an effective radius, i.e., the radius of a circle having the same cross-sectional area of the forward housing perpendicular to the axis of rotation.

The flowpath curve has a bulge and a local minimum. The bulge with radius $r_1$ is found by proceeding forward from the forward-most point of the forward blade root to where the radius reaches a maximum. The local minimum location with radius $r_2$ is found by proceeding aft from the bulge to where the radius stops decreasing within the axial extent of the forward blade root. The flowpath curve has ratio $r_1/r_2 > 1.029$. Furthermore, the axial distance $z_1$ between the bulge and local minimum may conform to the ratio $z_1/r_2 < 1.522$. Additionally, the forward housing may have a forward-most point wherein the axial distance $z_2$ between the local minimum and the forward-most end of the flowpath curve may conform to the ratio $z_2/r_2 < 4.115$. The above ratios may be tailored to suit a predetermined cruise Mach number, $M_0$, as shown in EQS. 4, 5, and 6 presented sequentially below:

$$\frac{r_1}{r_2} = (A2-1)\frac{M_0 - 0.60}{0.19} + 1 \quad \text{[EQ. 4]}$$

$$\frac{z_1}{r_2} = B2\left(\frac{M_0}{0.79}\right)^3 \quad \text{[EQ. 5]}$$

$$\frac{z_2}{r_2} = C2\left(\frac{M_0}{0.79}\right)^3 \quad \text{[EQ. 6]}$$

Where, $0.74 < M_0 < 0.86$, $1.04 < A2 < 1.14$, $0.78 < B2 < 1.18$, and $2.19 < C2 < 3.19$.

Also according to the disclosure, an unducted propulsion system for a subsonic aircraft having a cruise Mach number, $M_0$, 0.74 or greater, for example $0.74 < M_0 < 0.86$, includes a rotating element comprised of an axis of rotation, a forward blade assembly, and a forward housing. The forward housing, or spinner, rotates with the forward blade assembly about the axis of rotation. The forward blade assembly includes a plurality of blades, each blade having a root proximal to the axis of rotation and a tip distal from the axis of rotation. The axial direction, z, for the spinner is parallel to the axis of rotation, increasing in the forward or upstream direction. The radius, r, of the spinner shape is the distance from the axis of rotation. Radial coordinate, r, is an effective radius, i.e., a radius of a circle having the same cross-sectional area of the spinner perpendicular to the axis of rotation. The spinner has a bulge location with radius $r_1$ at a maximum radius forward of the forward blade assembly. Proceeding axially aft from the bulge, the spinner has a local minimum with radius $r_2$ where the radius stops decreasing within the axial extent of the forward blade roots. The spinner is shaped such that ratio $r_1/r_2 > 1.066$. Furthermore, the axial distance $z_1$ between the bulge and local minimum may conform to the ratio $z_1/r_2 < 1.522$. Additionally, the forward housing may have a forward-most point wherein the axial distance $z_2$ between the local minimum and the forward-most end of the flowpath curve may conform to the ratio $z_2/r_2 < 4.115$. The above ratios may be tailored to suit a predetermined cruise Mach number, $M_0$, using EQS. 4, 5, and 6, where $0.74 < M_\sigma < 0.86$, $1.09 < A2 < 1.14$, $0.78 < B2 < 1.18$, and $2.19 < C2 < 3.19$ These and other features, aspects and advantages of the present disclosure and/or embodiments will become better understood with reference to the following description and appended claims. The accompanying drawings, which are incorporated in and constitute a part of this specification illustrate embodiments of the present disclosure and, together with the description, serve to explain the principles of the present disclosure.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In the Figures which follow, like reference numerals are utilized to refer to like elements throughout the various embodiments depicted in the Figures.

FIG. 1 shows an elevational cross-sectional view of an exemplary unducted propulsion system 100. As is seen from FIG. 1, the unducted propulsion system 100 takes the form of an open rotor propulsion system and has a rotating element 138 depicted as a propeller assembly which includes an array of blades 102 affixed to forward housing 106 and configured to rotate around an axis of rotation 120 of the unducted propulsion system 100. The unducted propulsion system 100 also includes in the exemplary embodiment a non-rotating stationary element 142 which includes an array of blades 104, also known as vanes, disposed around axis of rotation 120. These blades may be arranged such that they are not all equidistant from the propeller. These blades are mounted to a stationary frame and do not rotate relative to the central axis 120. The non-rotating stationary element 142 includes a stationary aft housing 126. Forward housing 106 and aft housing 126 have external surfaces that are three-dimensional. To explain the surface shaping guidance disclosed herein, parameters are defined along flowpath curves that correspond to intersecting the external surfaces with a plane that includes the axis of rotation. Accordingly, flowpath curve 105 corresponds to the intersection of forward housing 106 with an z-r plane that includes the axis of rotation. Similarly, the flowpath curve 125 corresponds to the intersection of aft housing 126 with an z-r plane that includes the axis of rotation. For reference purposes, FIG. 1 also depicts a forward direction denoted with arrow 118.

As shown in FIG. 1, the exemplary unducted propulsion system 100 also includes a drive mechanism 128 which provides torque and power to the rotating element 138 through a transmission (not shown). In various embodiments, the drive mechanism 128, also known as an engine, may be a gas turbine engine, an electric motor, an internal combustion engine, or any other suitable source of torque and power and may be located in proximity to the rotating element 138 or may be remotely located with a suitably configured transmission. Transmission transfers power and torque from the drive mechanism 128 to the rotating element 138 and may include one or more shafts, gearboxes, or other mechanical or fluid drive systems. In FIG. 1, drive mechanism 128 is depicted schematically as comprising a gas generator 130 and a power turbine 132. An example of a turbomachine comprising a gas generator (e.g., compressor, combustor & high-speed turbine) and power turbine of a gas turbine engine is shown and described in US20210108597, hereby incorporated by reference in its entirety for all purposes. Alternative configurations to the one illustrated in FIG. 1 herein are depicted in U.S. Ser. No. 10/704,410, U.S. Pat. Nos. 5,190,441, 9,340,277, and U.S. Ser. No. 10/358,926, hereby each incorporated by reference in their entirety for all purposes.

Airfoil blades 102 of rotating element 138 are sized, shaped, and configured to produce thrust by moving a working fluid such as air in a direction 144 as shown in FIG. 1 when the rotating element 138 is rotated in a given direction around the axis of rotation 120. In doing so, blades 102 impart a degree of swirl to the fluid as it travels in the direction 144. Blades 104 of the stationary element are sized, shaped, and configured to decrease the swirl magnitude of the fluid, so as to increase the kinetic energy that generates thrust for a given shaft power input to the rotating element. Each rotating blade 102 has blade root 122 and blade tip 124. Each stationary blade 104 has a blade root 136 and blade tip 134. For both rotating blades 102 and stationary blades 104, span is defined as the distance between root and tip. Stationary blades 104 may have a shorter span than rotating blades 102, for example, 50% of the span of blades 102, or may have longer span or the same span as blades 102 as desired. In FIG. 1, stationary blades 104 are shown affixed to the housing 126 at their respective blade roots 136. In some embodiments some or all stationary blades 104 may be affixed to, or integrated with, the aircraft structure, such as a wing, pylon, or fuselage. The number of blades 104 of the stationary element may be fewer or greater than, or the same as, the number of blades 102 of the rotating element and is typically greater than two, or greater than four. In some embodiments a ratio of the number of rotating blades 102 to a number of stationary blades 104 is between 2:5 and 2:1. In some embodiments a difference between the number of rotating blades 102 to a number of stationary blades 104 is between 2 and −2.

Blades 104 of the stationary element 142 may be positioned aerodynamically upstream of the rotating blades 102 to serve as counter swirl vanes, i.e., imparting a tangential velocity which is opposite to the rotation direction of the rotating element 138. Alternatively, and as shown in FIG. 1, stationary blades 104 may be positioned aerodynamically downstream of the rotating blades 102 to serve as de-swirl vanes, i.e., imparting a change in tangential velocity which is counter to that of the rotating element 138. Any swirl remaining in the airstream downstream of the unducted propulsion system 100 equates to a loss in thrust producing kinetic energy.

It may be desirable that either or both of the sets of rotating blades 102 and stationary blades 104 incorporate a pitch change mechanism such that the blades can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft.

An inlet 127 is located axially between the blades 104 and blades 102. Alternatively, the inlet 127 may be located elsewhere, for example, forward of the blades 102. A ratio of a mass of air accelerated by the rotating blades 102 and bypassing the inlet 127 to the mass of air accelerated by the rotating blades and entering the engine core (not shown) via the inlet 127 is known as the bypass ratio. In some embodiments, a ratio of the sweep area of the blades (computed as $\pi \times [(\text{blade tip radius})^2 - (\text{blade root radius})^2]$) to the cross-sectional area of the inlet (as measured in a z-r plane) is greater than 20:1 or greater than 30:1, and less than 80:1.

It will be appreciated that the exemplary unducted propulsion system 100 depicted in FIG. 1 is by way of example only. In other exemplary embodiments, it may have other suitable configurations. For example, instead of being a forward rotating blade assembly and an aft stationary blade assembly as shown, the two blade assemblies could be counter-rotating with respect to one another. As another example, the forward blade assembly could be stationary and the aft blade assembly could be rotating. As another example, the unducted propulsion system may consist of only a rotating blade assembly, i.e., a propeller.

Figure 2:
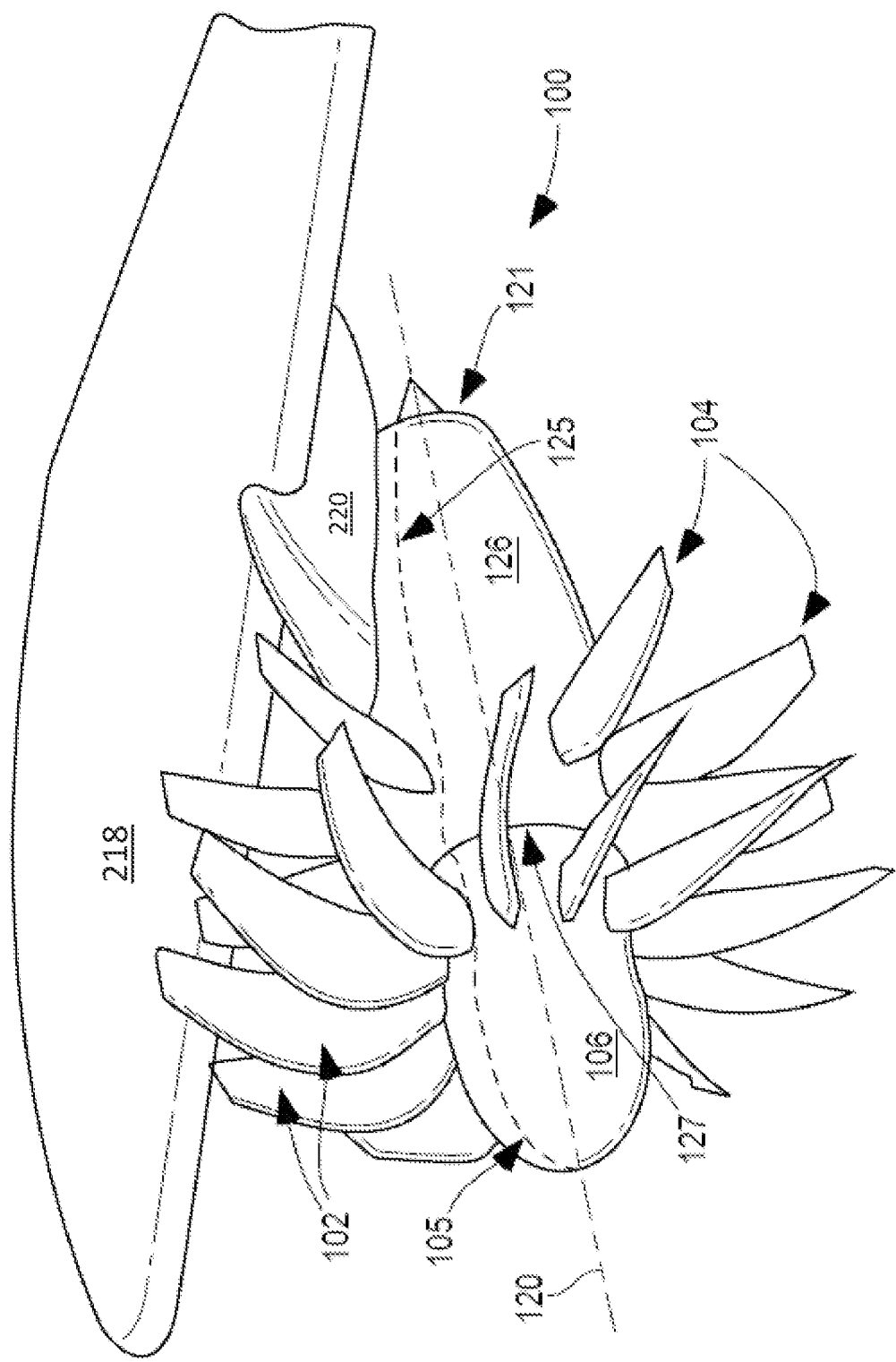
FIG. 2 is a schematic, perspective view of an exemplary gas turbine engine attached to a wing of an aircraft in accordance with some embodiments.

FIG. 2 is a perspective view of an exemplary gas turbine engine attached to a wing of an aircraft in accordance with some aspects of the present disclosure. FIG. 2 depicts the unducted propulsion system 100 mounted to a wing 218 via a pylon 220 to facilitate mounting to, or accommodation of the airframe structure. Additionally, each of blades may not all be equally spaced from each other and/or at the same axial, z, location. These are examples of where a housing 126 may not be axisymmetric.

The unducted propulsion system 100 includes a turbomachine substantially contained within a forward housing or spinner 106 and aft housing 126. In some configurations, both the forward housing 106 and the aft housing 126 include rotating hubs associated with rotating blades 102 and 104, respectively. In other configurations, one of the forward housing 106 and the aft housing 126 are entirely rotating or include a rotating structure such as a rotating hub, while the other is a stationary housing associated with respective rotating and stationary blades. In some embodiments, forward housing 106 may be considered a spinner and aft housing 126 may be considered a nacelle. Aft housing 126 may contain a compressor, combustor, and turbine of a turbomachine, followed by engine exit 121.

In an illustrative non-limiting example as depicted in FIG. 2, the unducted propulsion system 100 includes a rotating assembly (or rotor) that includes a forward housing 106 and airfoil-shaped assembly of blades 102 (may also be referred to as a fan, rotor, or propeller) associated with the forward housing 106. In this example, the forward housing 106 is a spinner that rotates about an axis of rotation 120. In other configurations the forward housing may not be rotating, as when the system is comprised of a stationary forward blade assembly and rotating aft blade assembly. The unducted propulsion system 100 also includes a stationary assembly that may include the engine inlet 127 and airfoil shaped stationary assembly of blades 104 associated with aft housing 126. In such a configuration, the housing 126 is non-rotating, as are the blades 104, about the axis 120 although the blades may separately articulate to modify a pitch, lean or sweep angle, e.g., via a mechanism contained within housing 126. At least one of the functions of the stationary assembly of blades 104 is to remove swirl from air stream leaving the rotor.

Aft housing 126 extends in an axial direction from engine inlet 127 to the engine exit 121. The aft housing 126 contains the internal machinery that produces torque for the assembly of blades 102 and defines a surface shaped to provide aerodynamic efficiency (reduce drag) for air passing through blades 102 and 104 and proceeding downstream. The stream exhausted from the engine exit 121 produces some of the thrust that propels and/or advances an aircraft forward. Most of the thrust produced by an engine of the unducted propulsion system 100 comes from accelerated air that passes over the housing 126, or the air that passes through the blades 104 and bypasses the inlet 127. In some embodiments, the engine may additionally include a third stream (the first and second streams being the bypass and turbomachine core airstream defined by a compressor, combustor, and turbine).

For simplicity of illustration in FIG. 2, forward housing 106 is shown as a continuous spinner. However, each housing may be comprised of separate parts with various mechanical components to allow variable pitch angle of the forward assembly of blades 102 and/or aft assembly of blades 104. The axial extent of such specialized parts of each housing may be approximately the same as a corresponding axial extent of the assembly of blades 102 and/or assembly of blades 104, or the axial extents of the housings may be shorter or longer (in axial extent) than the span of blades or respective axial extents of the blade assemblies. The dot-dashed line in FIG. 2 indicates an axis of rotation 120 for the blades 102. The dashed curves, 105 and 125, represent flowpath curves corresponding to the intersection of housings 106 and 126, respectively, with a plane that includes axis of rotation 120. In the illustrative example in which forward housing 106 and the associated forward assembly of blades 102 are rotating about axis of rotation 120, the shape of the flowpath curve may be defined by an effective radius vs. axial distance parallel to the axis of rotation 120. However, in this example in which the aft housing 126 and the associated aft assembly of blades 104 do not rotate about axis of rotation 120, the flowpath curve shape of radius vs. axal location depends on the orientation of the z-r plane about the axis of rotation, i.e., curve could have a different shape for different positions of the plane that intersects aft housing 126.

Referring to FIGS. 1 and 2, a flow restriction, known as blockage, for the flow of air passing through the row of blades 102 and/or blades 104 may be presented due to the assembly of blades 102 and/or the stationary assembly of blades 104 having thickness. Thus, not only does the flow of air accelerate through the row due to the generation of thrust, but the flow of air must accelerate further due to the blockage. At a high subsonic cruise, such as a flight Mach number ($M_0$) greater than about 0.74, these combined effects of the generated thrust and the blockage can cause the axial component of the velocity of the flow of air through the row to approach the speed of sound (i.e., Mach number of 1), known as choking, which can lead to high pressure loss within the blade 102 or blade 104 passage. Higher blade 102 or blade 104 counts, such as 8 to 18, can make choking a major concern because increasing the count increases the overall blockage of blade material for the air stream being accelerated by the assembly of blades 102.

Figure 3:
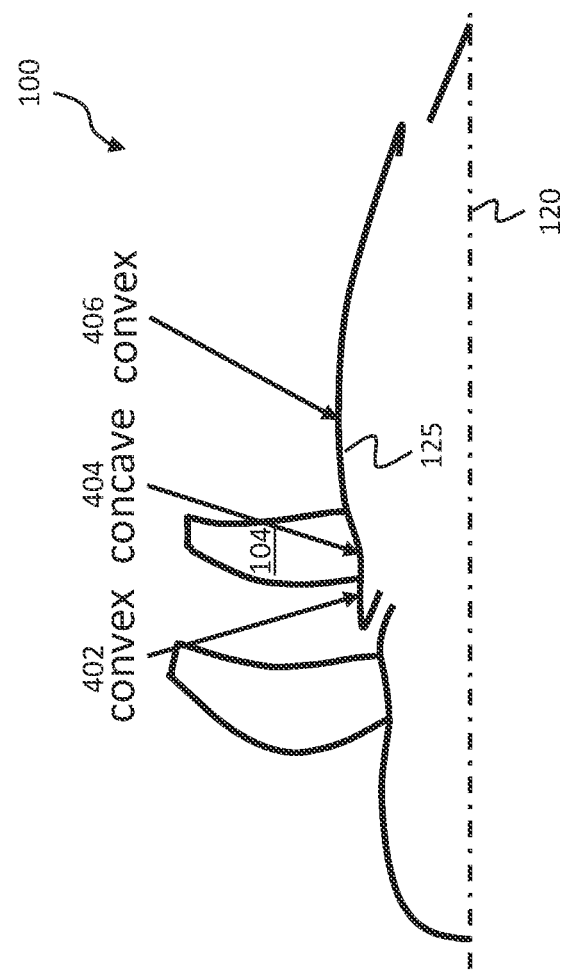
FIG. 3 is a cross-section of an exemplary unducted propulsion system showing curvature along a flowpath curve in accordance with some embodiments.

A strategy known as area ruling can reduce the Mach number in the passages within the blades 102 or blades 104. To visualize area ruling, FIG. 3 shows a section view of unducted propulsion system 100. Flowpath curve 125 corresponds to the intersection of the external surface of housing 126 of FIGS. 1 and 2 with a section plane that includes axis of rotation 120 as well as the aft-most point of an aft blade root 136 of a blade 104 in the aft blade assembly. Thus, a point on the external surface of housing 126 is determined by choosing a blade root 136 and the distance upstream or downstream parallel to the axis of rotation 120 from the aft-most point of the blade root 136. By making an aft housing surface concave 404, the Mach number within the passage of blades 104 can be reduced. The aft housing concave region 404 corresponds to a valley and locates a local minimum radius of the surface of the housing. Referring to the corresponding flow of air through the blades 104 and over the housing, i.e., the flowpath curve 125, there is seen a desirable reduction in velocity due to the concave shape of the housing at the location of blades 104. To achieve this concave region 404, which produced a desired result (lowered Mach number at the blades 104 to avoid choking) the radial distance of curve 125 from the axis of rotation 120 away from the blades 104 must increase, leading to convex 406 curvature downstream and possibly convex curvature 402 upstream. Thus, not only may the housing 126 need to bulge outward to accommodate internal components of the propulsion system, but it may also need to bulge outward to avoid choking in the passages between blades 104.

There may also be formed on the housing a convex portion 402 on the housing surface upstream of the blades 104. Thus, the housing 126 may bulge outward to accommodate internal components of the unducted propulsion system and bulge upstream for, e.g., accommodating components or the inlet 127. It may also be desirable to minimize the axial length of the unducted propulsion system. The goal of avoiding choking while limiting axial length may result in increasing the surface curvature of the housing 126, thereby causing local accelerations of the air along the flowpath curve 125, particularly at a convex portion. As described below, curvature near a convex portion of the surface of the flowpath curve 125 can present a challenge at high subsonic flight.

Figure 4:
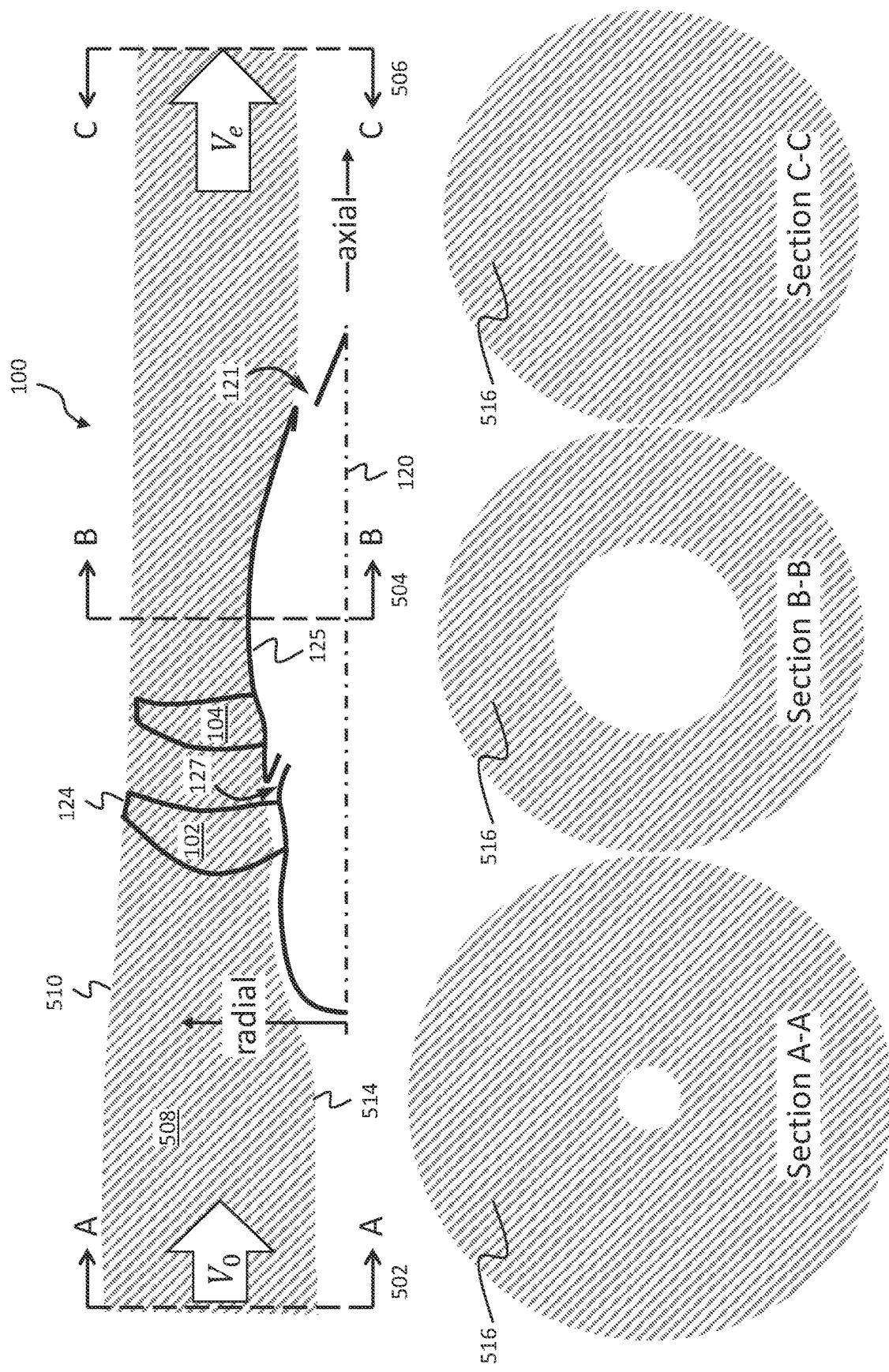
FIG. 4 illustrates a flow of air through an assembly of blades of an unducted propulsion system in accordance with some embodiments.

FIG. 4 illustrates the flow of air through the fan of an unducted propulsion system 100 of FIG. 1. Airspeed relative to the unducted propulsion system 100 and far upstream 502 of the unducted propulsion system 100 has a velocity $V_0$ (e.g., corresponding to $0.74<M_0<0.86$), which is the flight speed of the aircraft. Closer to the fan, the influence of the fan is to induce a higher velocity of air as the air enters the fan. As the air passes through the fan, the fan adds power to the stream of air passing through it, to accelerate (i.e., further increase the velocity) of the air that passes over the remainder of the propulsion system. In an area far downstream 506 in the axial direction, the stream of air reaches an exhaust velocity, $V_e$.

The stream of air that passes through the assembly of blades 104, from far upstream to far downstream, can be viewed as a tube of air (or fan stream tube) 508. The radial and axial extent of the fan stream tube 508 (airflow of the slipstream) is indicated by the hashed region. An outer boundary 510 of the fan stream tube 508 intersects a radially outermost section (or tip) 124 of the assembly of blades 102. An inner boundary 514 of the fan stream tube 508 intersects the assembly of blades 104 near the flowpath curve 125 and follows the shape of the flowpath curve 125 immediately downstream of the assembly of blades 104. Because in this illustrative example the engine inlet 127 ingests air from the innermost radial region between blades 102 and 104, the fan stream tube 508 excludes the portion of air passing through the blades 102 that enters the engine inlet 127 and exhausts through the engine exit 121. The average axial velocity of air at any axial location within the fan stream tube 508 can be visualized by an annular cross-sectional area 516 of the fan stream tube 508 at that location. Examples of an annular cross-sectional area 516 of the fan stream tube 508 are the far upstream 502, a nacelle bulge 504, and the far downstream 506 for selected locations along the fan stream tube 508.

Because the mass flow rate of the air through any annular area within the stream tube 508 and downstream of the inlet 127 is the same and the air density is roughly constant throughout the fan stream tube 508, the average axial velocity of air is roughly inversely proportional to the annular area 516. Thus, far upstream 502, where the velocity of the fan stream tube 508 entering the fan has not yet increased due to the fan, the annular area 516 is largest. Far downstream 506, the fan stream tube 508 includes energized air at a higher velocity relative to the velocity of air in the far upstream 502, so the annular area 516 is smaller than in 502. The smallest annular area relative to the annular areas along the fan stream tube 508 occurs over the housing 126 near bulge 504. At the nacelle bulge 504, the air has been energized by the assembly of blades 104, the radial distance from the axis of rotation is at a maximum radius, and the annular area 516 is the smallest relative to the other mentioned annular areas of the flowpath curve 125. Thus, the average axial velocity of the flow of air over the housing 126 (defining the surface of the flowpath curve 125) is high and attributable to a bulge in the flowpath curve 125.

Figure 5:
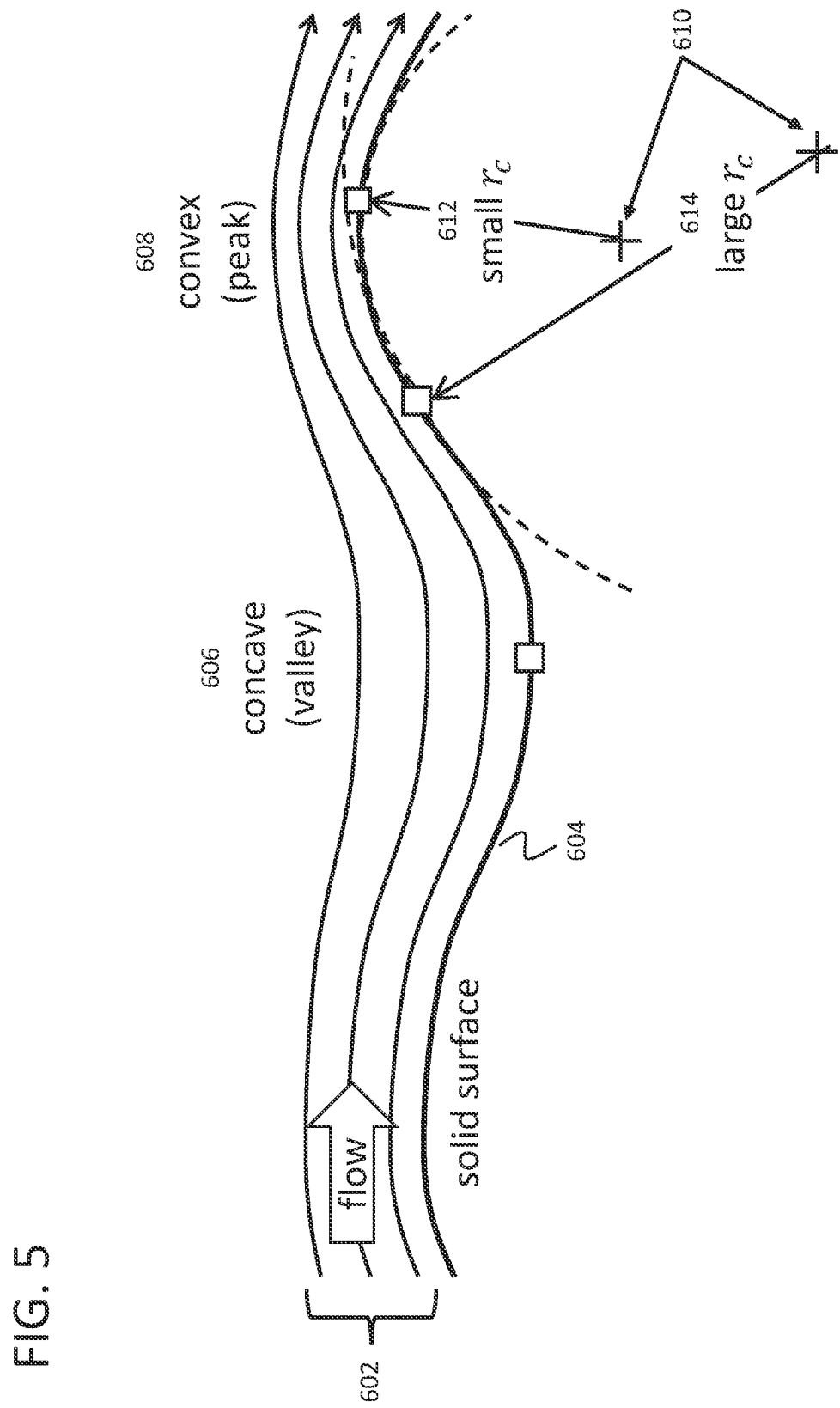
FIG. 5 illustrates an effect on air when air moves over a non-linear solid surface.

The problem due to the high average axial velocity of the flow of air over the nacelle is further explained in FIG. 5, which depicts the effects when air flows without friction from left to right over a wavy solid surface 604. Streamlines 602 indicate the path of fluid particles starting at various distances from the surface 604. A concave surface 606, or valley, increases the static pressure and reduces the velocity of the air. In contrast, a convex surface 608, or peak, decreases the static pressure and increases the velocity of the air. Thus, for flow over housing 126 of FIG. 1, the change in static pressure and the accompanying opposite change in velocity of air is governed in large part by the curvature associated with the housing 126.

Curvature of a surface can be expressed in terms of a corresponding radius of curvature. For example, at any point along the surface 604, one can define the radius of curvature, $r_c$, and a center of curvature 610. To illustrate, two radii of curvatures 612, 614 and their corresponding centers (shown as a "+") 610 corresponding to two surface locations are shown in FIG. 5. At a distance to the left of the peak of convex surface 608, the curvature is low, which corresponds to a large $r_c$ 614. Nearer to the peak of convex surface 608, the curvature is high, which corresponds to a small $r_c$ 612. Locations within the concave surface 606 also have low and high curvature. However, for points within concave surface 606, the center of curvature is located above curve 604 with the radius of curvature pointing towards the surface 604.

As explained above, the flow of air over the housing 126 can have a higher average velocity than the fan flow downstream of the engine, $V_e$, and this effect can present a problem for a high subsonic flight. In particular, as the speed of air over the flowpath surface 125 approaches the speed of sound, or Mach=1.0, the drag begins to increase sharply. In general, friction drag increases roughly in proportion to the square of the air velocity. However, as the Mach number increases, a larger contributor to the increased in drag comes from wave drag. A wave drag is a drag resulting from shock waves that form as the flow of air near the housing surface 126 becomes supersonic (e.g., Mach>1.0).

The above explanation illustrates three factors that contribute to high drag. A first factor is high cruise flight Mach, $M_0$, for example $0.74<M_0<0.86$. A second factor is high non-dimensional cruise fan net thrust based on fan annular area and flight speed. The same acceleration of the air stream by the fan that produces thrust also tends to increase the drag force on housing 126 (e.g., nacelle). Expressing thrust non-dimensionally in a way that accounts for flight speed, ambient conditions, and fan annular area yields a thrust parameter $$\frac{F_{net}}{\rho_0 V_0^2 A_{an}},$$

where $F_{net}$ is cruise fan net thrust, $\rho_0$ is ambient air density, $V_0$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan. A third factor is a large ratio of maximum radius of housing 126 relative to the local minimum radius associated with the aft blade root 136 combined with a relatively small ratio of axial length between the local minimum radius and the maximum radius for housing 126 to the local minimum radius associated with the aft blade root 136.

Figure 6:
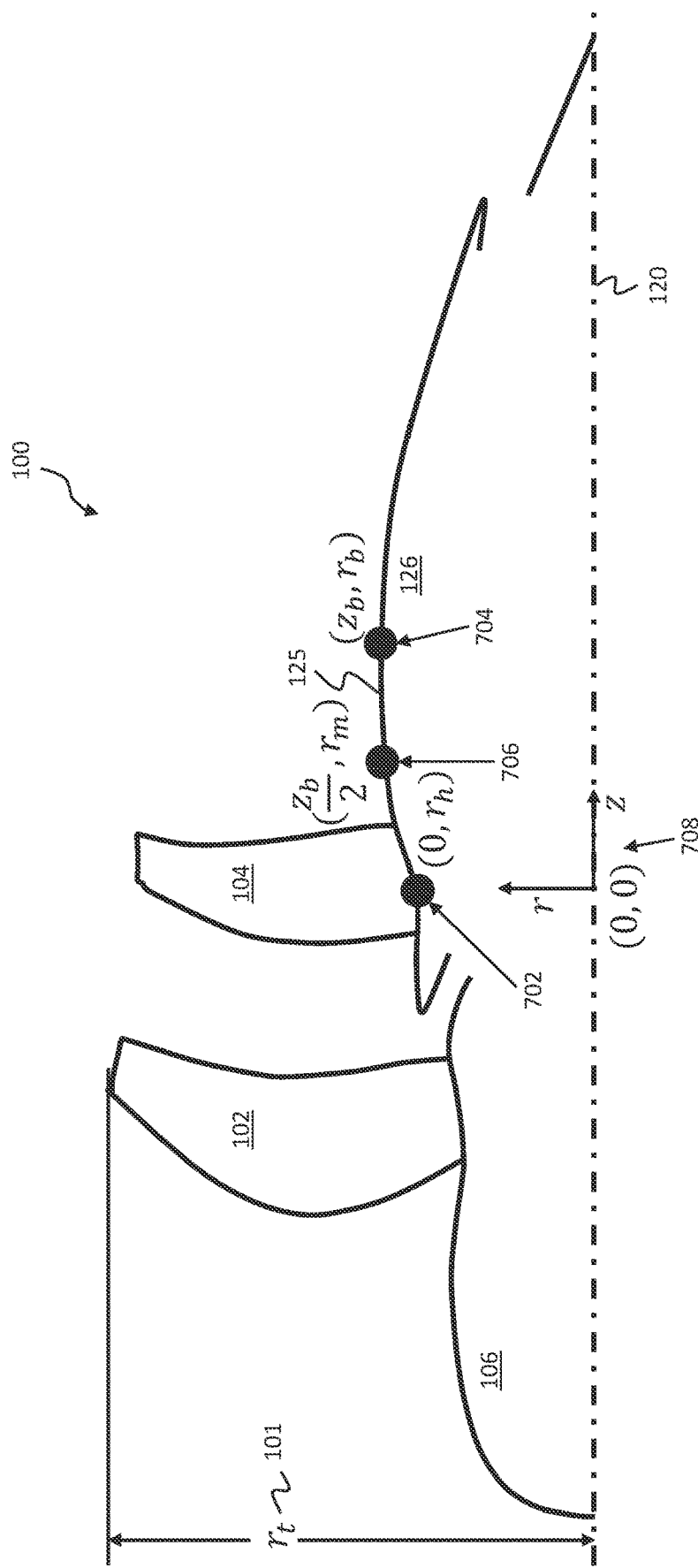
FIG. 6 shows a schematic illustration of three surface locations defining an exemplary flowpath curve for an aft housing in accordance with some embodiments.

A solution to the problem presented by wave drag at a high subsonic flight (e.g., $0.74<M_0<0.86$) is to design a shape of a flowpath curve 125 on the housing 126 based on an unconventional surface curvature strategy. FIG. 6 shows a schematic illustration of three surface locations 702, 704, and 706 on the flowpath curve 125. As for FIGS. 3 and 4, flowpath curve 125 corresponds to the intersection of the external surface of housing 126 shown in FIGS. 1 and 2 with a plane that includes axis of rotation 120 and the aft-most point of an aft blade root 136 in the aft blade assembly. Thus, curve 125 corresponds to proceeding along the surface of housing 126 axially forward and aft from the aft-most point on an aft blade root 136. If the aft blade used to define the flowpath curve 125 has variable orientation, such as actuated by a pitch change mechanism, the most relevant aft blade orientation for locating the flowpath curve is when the aft-most point of the aft blade root 136 is furthest aft. In case the aft-most point of the aft blade root 136 is not attached to housing 126, e.g., there is a clearance gap between the aft blade root 136 and the housing 126 to allow for pitch change or the aft blade 104 is attached to the airframe and suspended over the housing 126, then curve 125 goes through the nearest point on the surface of housing 126 to the aft-most point of the aft blade root 136. Each surface location along flowpath curve 125 can be defined based on an (z, r) coordinate system 708 in which the z-axis is the axis of rotation 120 and r is the distance from the axis of rotation 120.

Flowpath curve 125 has a bulge, or maximum radius location 704 corresponding to $(z_b, r_b)$ of the (z, r) coordinate system 708 and has a maximum radius $r_b$. Flowpath curve 125 has a local minimum location 702 forward of the bulge location at 704 corresponding to $(0, r_h)$ of the $(z, r)$ coordinate system 708 and has a radius $r_h$. Surface locations at $(0, r_h)$ and $(z_b, r_b)$ determine the axial and radial extent of a segment of the flowpath curve 125 where the shape is designed as described herein to solve the problem of high wave drag for high subsonic flight.

Flowpath curve 125 has a third location 706 corresponding to $(z_b/2, r_m)$ in the $(z, r)$ coordinate system 708 and has an axial distance halfway between the first surface location 702 and the second surface location 704. For fixed endpoints 702 and 704 for the segment of curve 125, specifying location of 706 has a strong effect on the distribution of curvature. Radii $r_h$ 113, $r_m$ 117, $r_b$ 111, and axial distance $z_b$ 115 are also shown in FIG. 1.

For high subsonic cruise, achieving low drag without unwanted length increase for housing 126 at high subsonic cruise Mach number, i.e. $M_0 > 0.74$, depends on appropriate positioning of points/endpoints/locations 702, 704, and 706. For example, for sufficient bulge to suppress the Mach number within the aft blade assembly, limited length to avoid excessive friction drag and weight, and limited convex curvature approaching bulge, it may be desirable for $r_b/r_h > 1.081$, $z_b/r_h < 2.103$, and $(r_m/r_h - 1)/(r_b/r_h - 1) > 0.59$. Better results may be obtained with somewhat larger radius increases and shorter axial distance such that $r_b/r_h > 1.118$, $z_b/r_h < 1.974$, and $(r_m/r_h - 1)/(r_b/r_h - 1) > 0.64$. Also, it may be beneficial to impose an upper limit on the bulge such that $r_b/r_h < 1.424$.

Additionally, the above ratios may be tailored to suit a pre-determined cruise flight Mach number, $M_0$, with constants A1, B1, and C1, as shown in EQs 1, 2, and 3

$$\frac{r_b}{r_h} = (A1 - 1)\frac{M_0 - 0.60}{0.19} + 1 \qquad \text{EQ. 1}$$

$$\frac{z_b}{r_h} = B1(M_0/0.79)^3 \qquad \text{EQ. 2}$$

$$\frac{r_m/r_h - 1}{r_b/r_h - 1} = C1 \qquad \text{EQ. 3}$$

Where $M_0 > 0.74$, $A1 > 1.11$, $B1 < 1.63$, and $C1 > 0.59$. Additional limits on each parameter may yield a more optimum configuration, e.g., $0.74 < M_0 < 0.86$, $1.11 < A1 < 1.31$, $1.23 < B1 < 1.63$, and $0.59 < C1 < 0.79$. An example of further constraints on the constants used to configure aft housing 126 include $1.16 < A1 < 1.31$, $1.23 < B1 < 1.53$, and $0.64 < C1 < 0.79$. As another example of constraints on the constants, $1.16 < A1 < 1.26$, $1.33 < B1 < 1.53$, and $0.64 < C1 < 0.74$.

Table 1 provides examples for the ratio of the bulge radius $(r_b)$ 111 to the local minimum radius $(r_h)$ 113 where $1.11 < A1 < 1.31$ (in bold) and $0.74 < M_0 < 0.86$.

TABLE 1

| | A1 values & $r_b/r_h$ | | | | |
|---|---|---|---|---|---|
| $M_0$ | 1.11 | 1.16 | 1.21 | 1.26 | 1.31 |
| 0.74 | 1.081 | 1.118 | 1.155 | 1.192 | 1.228 |
| 0.79 | 1.110 | 1.160 | 1.210 | 1.260 | 1.310 |
| 0.84 | 1.139 | 1.202 | 1.265 | 1.328 | 1.392 |
| 0.86 | 1.151 | 1.219 | 1.287 | 1.356 | 1.424 |

Table 2 provides examples for the ratio of the axial distance 115 between the local minimum and the bulge location and the local minimum radius $(r_h)$ 113 where $1.23 < B1 < 1.63$ (in bold) and $0.74 < M_0 < 0.86$.

TABLE 2

| | B1 values & $z_b/r_h$ | | | | |
|---|---|---|---|---|---|
| $M_0$ | 1.23 | 1.33 | 1.43 | 1.53 | 1.63 |
| 0.74 | 1.011 | 1.093 | 1.175 | 1.257 | 1.340 |
| 0.79 | 1.230 | 1.330 | 1.430 | 1.530 | 1.630 |
| 0.84 | 1.479 | 1.599 | 1.719 | 1.839 | 1.959 |
| 0.86 | 1.587 | 1.716 | 1.845 | 1.974 | 2.103 |

Table 3 provides examples for the ratio $(r_m/r_h - 1)/(r_b/r_h - 1)$ where $0.59 < C1 < 0.79$ (in bold) and $0.74 < M_0 < 0.86$.

TABLE 3

| | C1 values & $(r_m - r_h)/(r_b - r_h)$ | | | | |
|---|---|---|---|---|---|
| $M_0$ | 0.59 | 0.64 | 0.69 | 0.74 | 0.79 |
| 0.74 | 0.59 | 0.64 | 0.69 | 0.74 | 0.79 |
| 0.79 | 0.59 | 0.64 | 0.69 | 0.74 | 0.79 |
| 0.84 | 0.59 | 0.64 | 0.69 | 0.74 | 0.79 |
| 0.86 | 0.59 | 0.64 | 0.69 | 0.74 | 0.79 |

In addition to applying to a range of cruise flight Mach number, $M_0$, the above constraints on curve 125 may be particularly beneficial for a range of a dimensionless cruise fan net thrust parameter normalized by ambient density, cruise flight speed squared, and fan stream tube annular area at fan inlet, $$\frac{F_{net}}{\rho_0 V_0^2 A_{an}}.$$

In the above thrust parameter, $F_{net}$ is cruise fan net thrust, $\rho_0$ is ambient air density, $V_0$ is cruise flight velocity, and $A_{an}$ is annular cross-sectional area perpendicular to the axis of rotation of the fan stream tube entering the fan. For the illustrative example shown in FIG. 1, the annular area would be computed using $r_t$ 101, the radial distance from the axis of rotation 120 to a tip end of a blade 102 in the forward blade assembly, and the minimum radius of the fan stream tube at the same axial location. For the example of FIG. 1 in which the engine inlet stream occupies a portion of the forward blade assembly annular area, a method to estimate the minimum radius of the fan stream tube would be used by those skilled in the art, using parameters such as fan thrust, engine inlet flow, and flight conditions. The thrust parameter may be, greater than or equal to 0.060, (e.g., greater than 0.080, or greater than 0.084).

Figure 7:
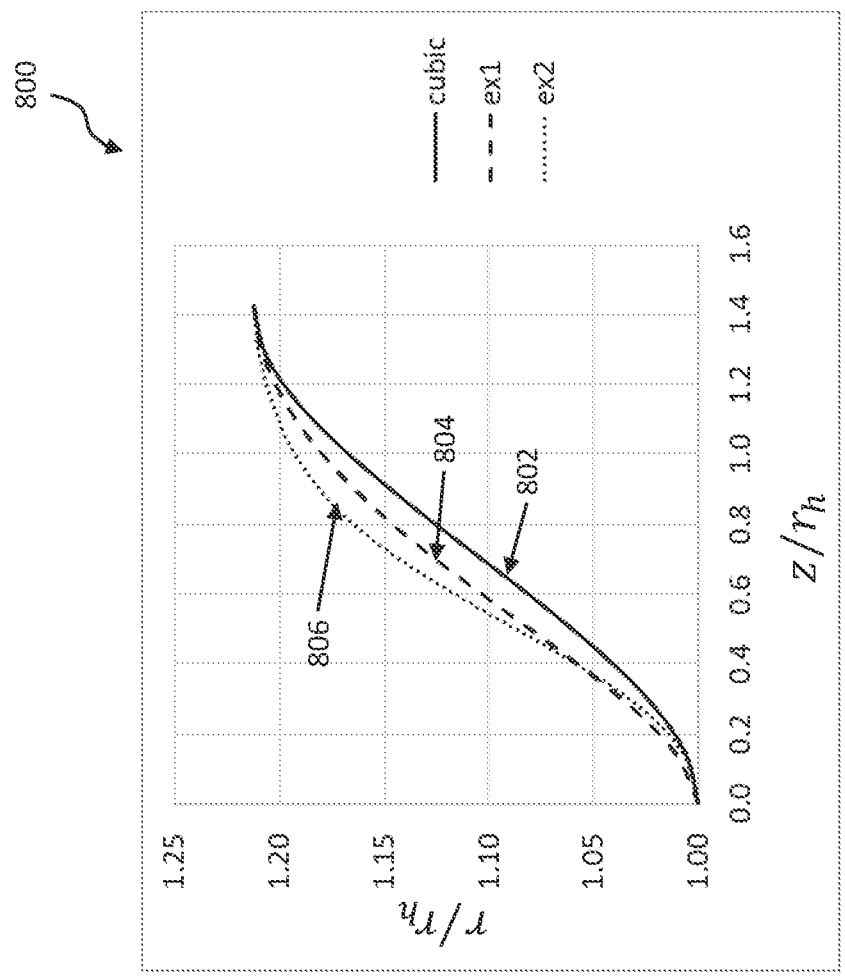
FIG. 7 illustrates examples of flowpath curves for an aft housing in accordance with some embodiments.

The unconventional surface curvature strategy described above to solve the problem presented by the wave drag for a sustained high subsonic flight (e.g., $0.74 < M_0 < 0.86$) is applicable for the unducted propulsion systems as described herein. In some configurations, the unconventional surface curvature strategy may be applicable to an unducted propulsion system having no engine inlet (inlet 127 omitted); for example, a rotor not driven by an air-breathing engine, but driven by another type of machine, such as an electric motor. FIG. 7 depicts a graph 800 of three exemplary flowpath curves 125 that may be used to define the surface of housing 126 shown in FIGS. 1 and 2. The flowpath curves 125 proximate aft housing 126 and between the surface locations at $(0, r_h)$ and $(z_b, r_b)$ of the $(z, r)$ coordinate system 708 as shown in FIG. 6.

Figure 8:
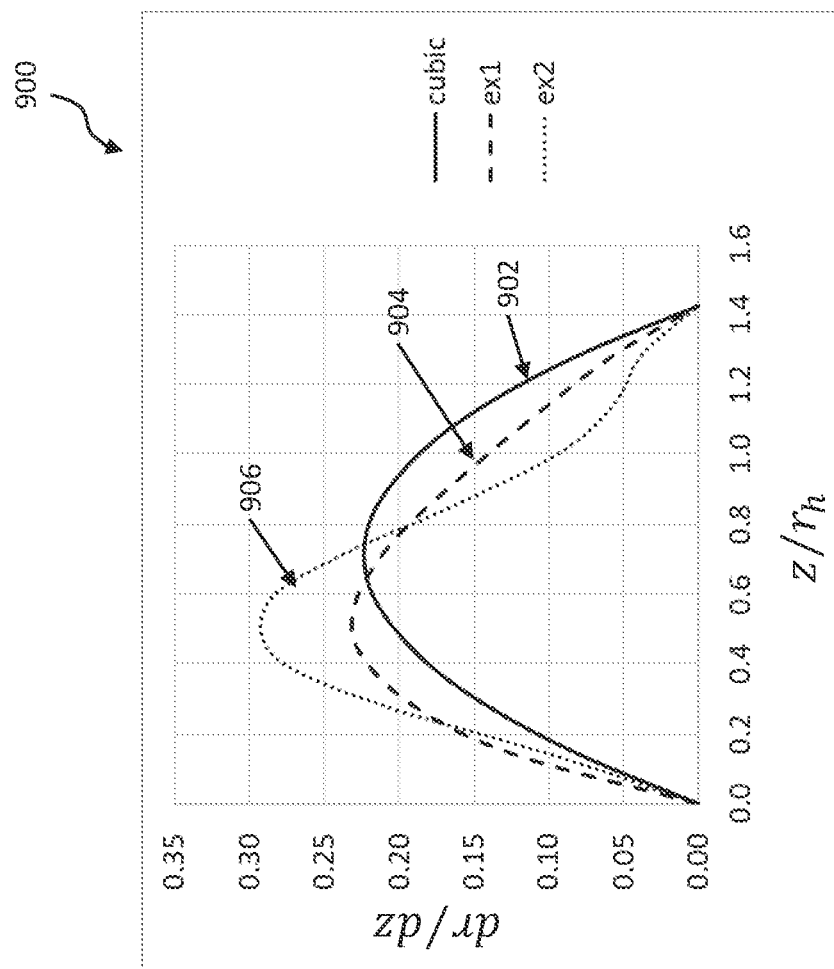
FIG. 8 shows an exemplary graph of the same three flowpath curves in FIG. 7 in terms of their first derivative with respect to axial distance in accordance with some embodiments.

To explain how the points 702, 704, and 706 in FIG. 6 define the shape of the aft housing 126 to reduce drag at high speed flight, three exemplary flowpath curves 125 between points 702 and points 704 are plotted with z and r nondimensionalized by the local minimum radius $r_h$ in graph 800 of FIG. 7. To facilitate comparison, the three curves conform to EQS. 1, 2, and 3 with $M_0$=0.79, A1=1.21, and B1=1.43, with differences only in parameter C1. Flowpath curve 802 corresponds to C1=0.50 and is described by a cubic polynomial shape, labeled "cubic". Flowpath curve 802 gives a smooth variation in curvature relative to curves 804 and 806. Flowpath curve 804 corresponds to C1=0.61 and is labeled "ex1". Flowpath curve 806 corresponds to C1=0.69 and is labeled "ex2". Over more than the first one-third of its length, flowpath curve 804, designated "ex1," has a more rapid increase radius with axial distance than curve 802. Flowpath curve 806, designated "ex2," also has a more rapid increase in radius than curve 802, but has less variation in radius near the peak radius of the housing (the flowpath curve 125 location having the maximum radius $r_b$) than either curve 802 or 804. FIG. 8 shows a graph 900 the first derivatives of r with respect to z for the curves in FIG. 7. All curves begin and end with first derivative of zero because the ends are at the local minimum and maximum radii. Plots 902, 904 and 906 correspond to the first derivatives of the cubic, ex1, and ex2 curves in FIG. 7.

Figure 9:
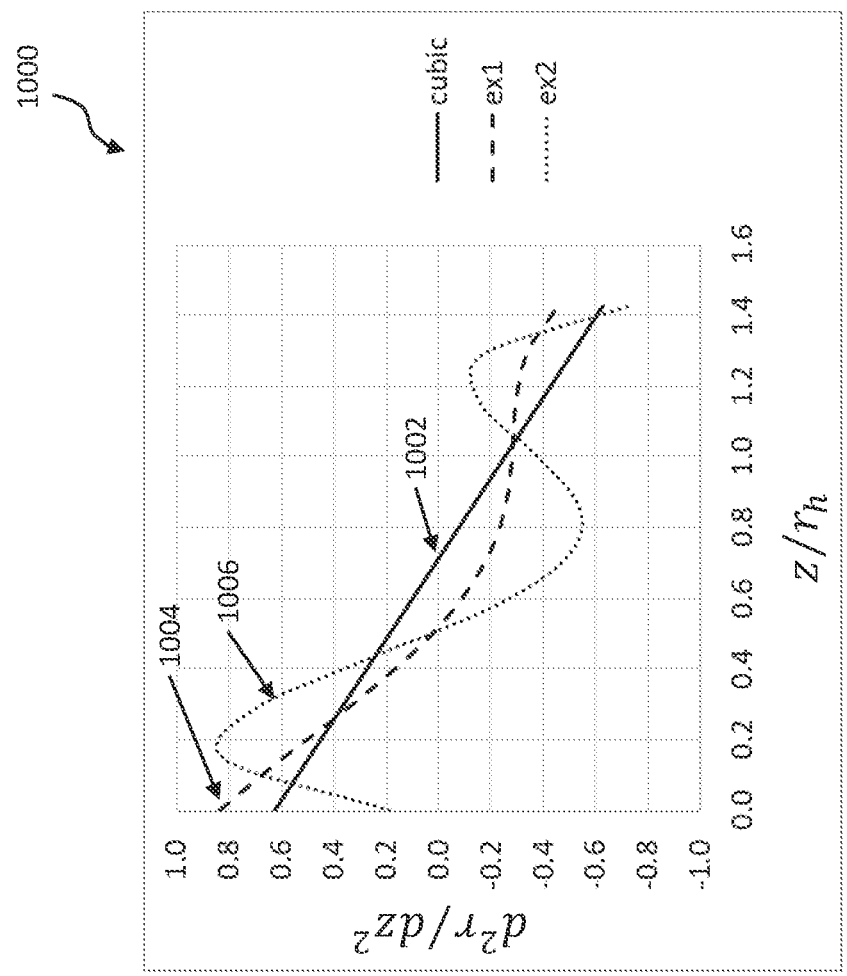
FIG. 9 illustrates curvature by showing the second derivative with respect to axial distance of the three curves in FIG. 7 in accordance with some embodiments.

FIG. 9 shows a graph 1000 of the second derivatives of r with respect to z for the three curves in FIG. 7. Second derivative indicates curvature and a positive second derivative indicates concave curvature while a negative second derivative indicates convex curvature. The absolute value of the second derivative indicates the magnitude of curvature. Curves 1002, 1004 and 1006 are the second derivatives for the flowpath curves "cubic", "ex1" and "ex2", respectively, shown in FIG. 7. The cubic polynomial flowpath curve has the smoothest curvature variation (linear with axial distance). Flowpath curve "ex1" also has a monotonic variation in curvature, however, its curvature 1004 starts higher near the aft blade root 136 and decreases continuously towards the maximum radius. "Front-loading" the curvature in this way results in a lower magnitude of convex curvature at the maximum radius than curvature 1002. Flowpath curve "ex2" has larger variations in third curvature 1006 that achieve suppression of the Mach number within the passages of blades 104 and avoids high convex curvature immediately upstream of the maximum radius. Because curve "ex2" has relatively low convex curvature where the combined effects of fan stream tube acceleration and flowpath curve radius increase may otherwise lead to excessive Mach number, the third curvature 1006 ("ex2") may be preferred.

As previously discussed, the speed at which an aircraft can fly is limited by numerous factors. With respect to propeller-driven aircraft, the propeller plays an important role in the speed at which the aircraft can fly. At a high level, the larger the propeller and/or the greater the number of blades the propeller has, the faster the aircraft can fly. Unfortunately, while speed is often directly proportional to both the size of the propeller and the number of blades, so is weight, and large size creates problems for propulsion system installation and feasibility. For example, as the size of the propeller and/or the number of blades increases, the weight of the propeller generally increases, and larger propellers can be difficult to accommodate while maintaining ground or fuselage clearances for a select airframe configuration. Also, at high subsonic flight speeds, a larger number of blades increases the flow-area blockage in the propeller blade row, which is problematic given the transonic flow around the blades. In particular, too much blockage decreases propeller efficiency and range of operability. Accordingly, creating an acceptable aircraft capable of flying at higher sustained speeds (e.g., cruise speeds) requires more than increasing the size of the propeller and/or increasing the number of propeller blades.

Figure 10:
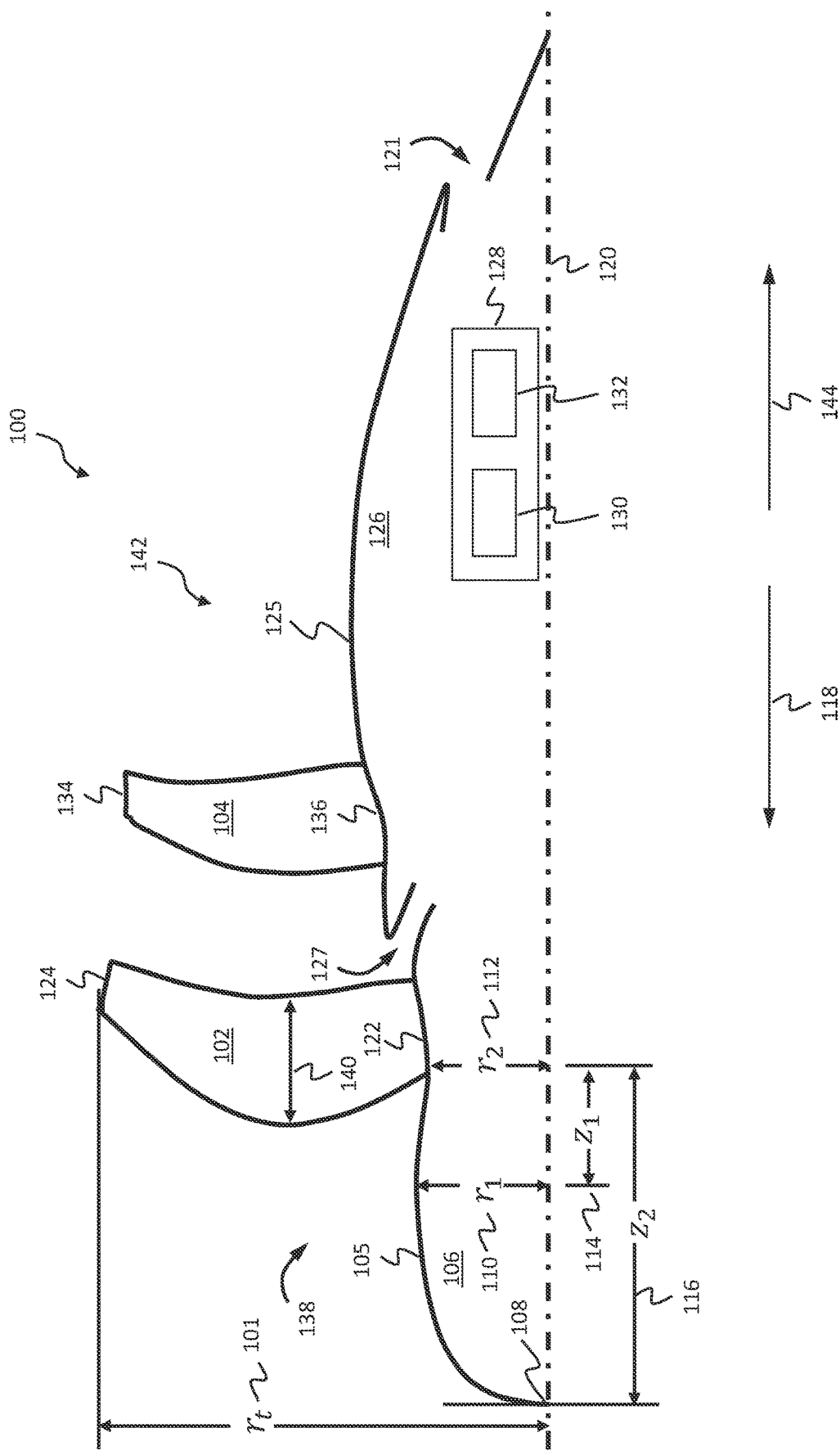
FIG. 10 shows the same elevational cross-sectional view of the unducted propulsion system of FIG. 1, but with element numbering referring in particular to a forward housing or spinner portion, in accordance with some embodiments.

FIG. 10 shows the same cross-sectional view as in FIG. 1, but with annotations made to the forward part of the unducted propulsion system 100, in particular the rotating element 138, which comprises a forward housing depicted as spinner 106 and the plurality of blades 102. The blades 102 have blade roots 122 and blade tips 124. The blades 102 are affixed to the spinner 106 at the blade roots 122. The rotating element 138 can have any suitable number of blades 102. For example, in one embodiment, the rotating element 138 includes between 8 and 18 blades. The spinner 106 and the blades 102, as part of the rotating element 138, rotate about the axis of rotation 120. The spinner 106 has a forward-most point/end/location 108, relative to an arrow 118 indicating a direction of travel of the unducted propulsion system 100 and thus the aircraft.

The forward housing 106 is shaped such that it has a varying radius along its axial length and its shape is viewed along a flowpath curve 105 formed by the intersection of the spinner surface with a plane that includes the axis of rotation 120 and the forward-most point of a forward blade root 122. As stated previously, a flowpath curve is defined by the effective radius at axial locations in which the housing is rotating. Thus, in the illustrative example of FIG. 10, the forward blade root 122 chosen to construct the plane does not affect the flowpath curve 105. However, in some embodiments, the forward housing 106 may be stationary. Thus, the convention of specifying a forward blade root 122 to define the plane, and thus, flowpath curve 105, applies in other embodiments as this facilitates defining the curve for embodiments in which forward housing 106 is stationary. Flowpath curve 105 for spinner 106 has a bulge location at the axial location where the radius reaches a maximum axially forward of the forward-most point of forward blade root 122 of blade 102, determining the first radius 110 (denoted "$r_1$" in FIG. 10). Flowpath curve 105 for spinner 106 has a local minimum location where, proceeding axially aft from the bulge, the radius reaches the local minimum proximal to the blades 102, determining the second radius 112 (denoted "$r_2$" in FIG. 10). Thus, the axial location of the first radius 110 is located forward of the axial location of the second radius 112 (i.e., between the axial location of the second radius 112 and the forward-most location 108 of the spinner 106). Span of blade 102 is defined as the distance between blade root 122 and blade tip 124. In one embodiment, the blades 102 have a maximum axial distance/width 140 near mid span (i.e., 50% of the blade height from the blade root to blade tip). In one embodiment, the blades 102 are affixed to the spinner 106 such that, when oriented or configured for cruise operation, the forward-most point of the blade roots 122 is proximal to the local minimum having second radius 112, and such that 0 to 40 percent of the maximum width 140 is located forward of the forward-most point of the blade roots 122. In another embodiment, 20 to 40 percent of the maximum width 140 is located forward of the forward-most point of the blade roots 122.

In one embodiment, the first radius 110 is greater than the second radius 112 and thus defines a bulge of the spinner 106, the location on the spinner proceeding axially forward from the forward blade root 122 where the radius reaches a maximum. A first distance 114 (denoted by "$z_1$" in FIG. 10) is defined between the bulge having first radius 110 and the local minimum having second radius 112. A second distance (denoted by "$z_2$" in FIG. 10) is defined between the forward-most location 108 of the spinner 106 and the local minimum having second radius 112. The various parameters (i.e., the first radius 110, the second radius 112, the first distance 114, and the second distance 116) may be specified based on a predetermined speed of the aircraft. That is, suitable values for the various parameters are dependent upon a predetermined range of speeds of the aircraft. In some embodiments, the predetermined speed of the aircraft is based on a desired airspeed for the aircraft. For example, the predetermined speed for the aircraft can be a speed, or range of speeds, at which the aircraft is designed to operate while cruising. The predetermined speed for the aircraft can be any suitable value(s) and can range, for example, between Mach 0.74 and 0.86 also referred to herein as a high subsonic cruise speed. Though the example predetermined speed range of the aircraft is given as between Mach 0.74 and Mach 0.86, it should be noted that the range can be greater, or smaller, than the range provided and have higher and/or lower maximums and minimums. For example, predetermined flight Mach number can be between 0.78 and 0.84.

At a high level, the size of the bulge (i.e., the ratio of the first radius 110 to the second radius 112) beneficial for low pressure loss on the spinner and within the assembly of blades 102 increases as the predetermined speed of the aircraft increases. Put simply, the larger the bulge, the lower the flow velocities through the row of blades 102 for a particular flight speed. However, as the size of the bulge increases, the required length of the spinner 106 increases, increasing the weight of the rotating element 138. Accordingly, the size of the bulge is dictated by a number of factors based on the predetermined speed of the aircraft. Additionally, the minimal dimension of the second radius 112 is typically dictated by the equipment needed for the rotating element 138, such as blade retention hardware, pitch change mechanisms, counterweight systems, gearbox, gearbox cooling systems, lubrication systems, bearings, and drive shaft.

In one embodiment comprised of a forward assembly of blades and an aft assembly of blades, the non-dimensional bulge radius is $r_1/r_2 > 1.029$. In other embodiments, the size of the bulge is described by a ratio of the first radius 110 and the second radius 112 and defined by EQ. 4:

$$\frac{r_1}{r_2} = (A2 - 1)\frac{M_0 - 0.60}{0.19} + 1,$$

Where $r_1$ is the first radius 110, $r_2$ is the second radius 112 associated with housing 106, $M_0$ is Mach number for sustained high speed flight, such as cruise, of the aircraft, and A2 is a constant. In one embodiment, the value of A2 is within the range from 1.04 to 1.14. As can be seen by EQ. 4, the size of the bulge (i.e., the ratio of the first radius 110 to the second radius 112) increases as the predetermined speed of the aircraft increased for each value of A2 within the range. Specifically, for a minimum value of A2=1.04, the ratio of the first radius 110 to the second radius 112 is 1.029 for $M_0$=0.74, 1.040 for $M_0$=0.79, 1.051 for $M_0$=0.84, and 1.055 for $M_0$=0.86. For a maximum value A2=1.14, the ratio of the first radius 110 to the second radius 112 is 1.103 for $M_0$=0.74, 1.140 for $M_0$=0.79, 1.177 for $M_0$=0.84, and 1.192 for $M_0$=0.86. Table 4 provides examples for the ratio of the first radius 110 to the second radius 112 where 1.04<A2<1.14 (in bold) and 0.74<$M_0$<0.86.

TABLE 4

| | A2 values & $r_1/r_2$ | | | | |
|---|---|---|---|---|---|
| $M_0$ | 1.04 | 1.06 | 1.09 | 1.12 | 1.14 |
| 0.74 | 1.029 | 1.044 | 1.066 | 1.088 | 1.103 |
| 0.79 | 1.040 | 1.060 | 1.090 | 1.120 | 1.140 |
| 0.84 | 1.051 | 1.076 | 1.114 | 1.152 | 1.177 |
| 0.86 | 1.055 | 1.082 | 1.123 | 1.164 | 1.192 |

As previously discussed, the geometry of the spinner 106 can also be described based on the first distance 114 (i.e., the axial distance between the bulge having first radius 110 and the local minimum having second radius 112). In one embodiment comprised of a forward assembly of blades and an aft assembly of blades, the non-dimensional axial distance $z_1/r_2 < 1.522$. In another embodiment, the first distance 114 is described in terms of a ratio of the first distance 114 to the second radius 112 and defined by EQ. 5:

$$\frac{z_1}{r_2} = B2\left(\frac{M_0}{0.79}\right)^3$$

where $z_1$ is the first distance 114, $r_2$ is the second radius 112, $M_0$ is Mach number for sustained high speed flight, such as cruise, of the aircraft, and B2 is a value. In one embodiment, the value of B2 is within the range from 0.78 to 1.18. As can be seen by EQ. 5, the first distance 114 increases as the predetermined speed of the aircraft increases for each value of B2 within the range. Put simply, the length of the spinner 106 increases as the predetermined speed of the aircraft increases. Specifically, for a minimum value of B2=0.78, the ratio of the first distance 114 to the second radius 112 is 0.641 for $M_0$=0.74, 0.780 for $M_0$=0.79, and 0.938 for $M_0$=0.84, and 1.006 for $M_0$=0.86. For a maximum value B2=1.18, the ratio of the first distance 114 to the second radius 112 is 0.970 for $M_0$=0.74, 1.180 for $M_0$=0.79, 1.419 for $M_0$=0.84, and 1.522 for $M_0$=0.86. Table 5 provides examples for the ratio of the first distance 114 to the second radius 112 where 0.78<B2<1.18 (in bold) and 0.74<$M_0$<0.86.

TABLE 5

| | B2 values & $z_1/r_2$ | | | | |
|---|---|---|---|---|---|
| $M_0$ | 0.78 | 0.88 | 0.98 | 1.08 | 1.18 |
| 0.74 | 0.641 | 0.723 | 0.805 | 0.888 | 0.970 |
| 0.79 | 0.780 | 0.880 | 0.980 | 1.080 | 1.180 |
| 0.84 | 0.938 | 1.058 | 1.178 | 1.298 | 1.419 |
| 0.86 | 1.006 | 1.135 | 1.264 | 1.393 | 1.522 |

As previously discussed, the geometry of the spinner 106 can also be described based on a second distance 116 (i.e., a distance between the forward-most location 108 of the spinner 106 and the local minimum having second radius 112). In one embodiment comprised of a forward assembly of blades and an aft assembly of blades, the non-dimensional axial distance $z_2/r_2 < 4.115$. In one embodiment, the second distance 116 is described in terms of a ratio between the second distance 116 and the second radius 112 and defined by EQ. 6:

$$\frac{z_2}{r_2} = C2\left(\frac{M_0}{0.79}\right)^3$$

where $z_2$ is the second distance 116, $r_2$ is the second radius 112, $M_0$ is Mach number for sustained high speed flight, such as cruise, of the aircraft, and C2 is a value. In one embodiment, the value of C2 is within the range from 2.19 to 3.19. As can be seen by EQ. 6, the second distance 116 increases as the predetermined speed of the aircraft increases. Put simply, the length of the spinner 106 increases as the predetermined speed of the aircraft increases. Specifically, for a minimum value of C2=2.19, the ratio of the second distance 116 to the second radius 112 is 1.800 for $M_0$=0.74, 2.190 for $M_0$=0.79, 2.633 for $M_0$=0.84, and 2.825 for $M_0$=0.86. For a maximum value C2=3.19, the ratio of the second distance 116 to the second radius 112 is 2.622 for $M_0$=0.74, 3.190 for $M_0$=0.79, 3.835 for $M_0$=0.84, and 4.115 for $M_0$=0.86. Table 6 provides examples for the ratio of the second distance 216 to the second radius 112 where 2.19<C2<3.19 (in bold) and 0.74<$M_0$<0.86.

TABLE 6

| | C2 values & $z_2/r_2$ | | | | |
|---|---|---|---|---|---|
| $M_0$ | 2.19 | 2.39 | 2.69 | 2.99 | 3.19 |
| 0.74 | 1.800 | 1.964 | 2.211 | 2.457 | 2.622 |
| 0.79 | 2.190 | 2.390 | 2.690 | 2.990 | 3.190 |
| 0.84 | 2.633 | 2.873 | 3.234 | 3.594 | 3.835 |
| 0.86 | 2.825 | 3.083 | 3.470 | 3.857 | 4.115 |

Figure 11:
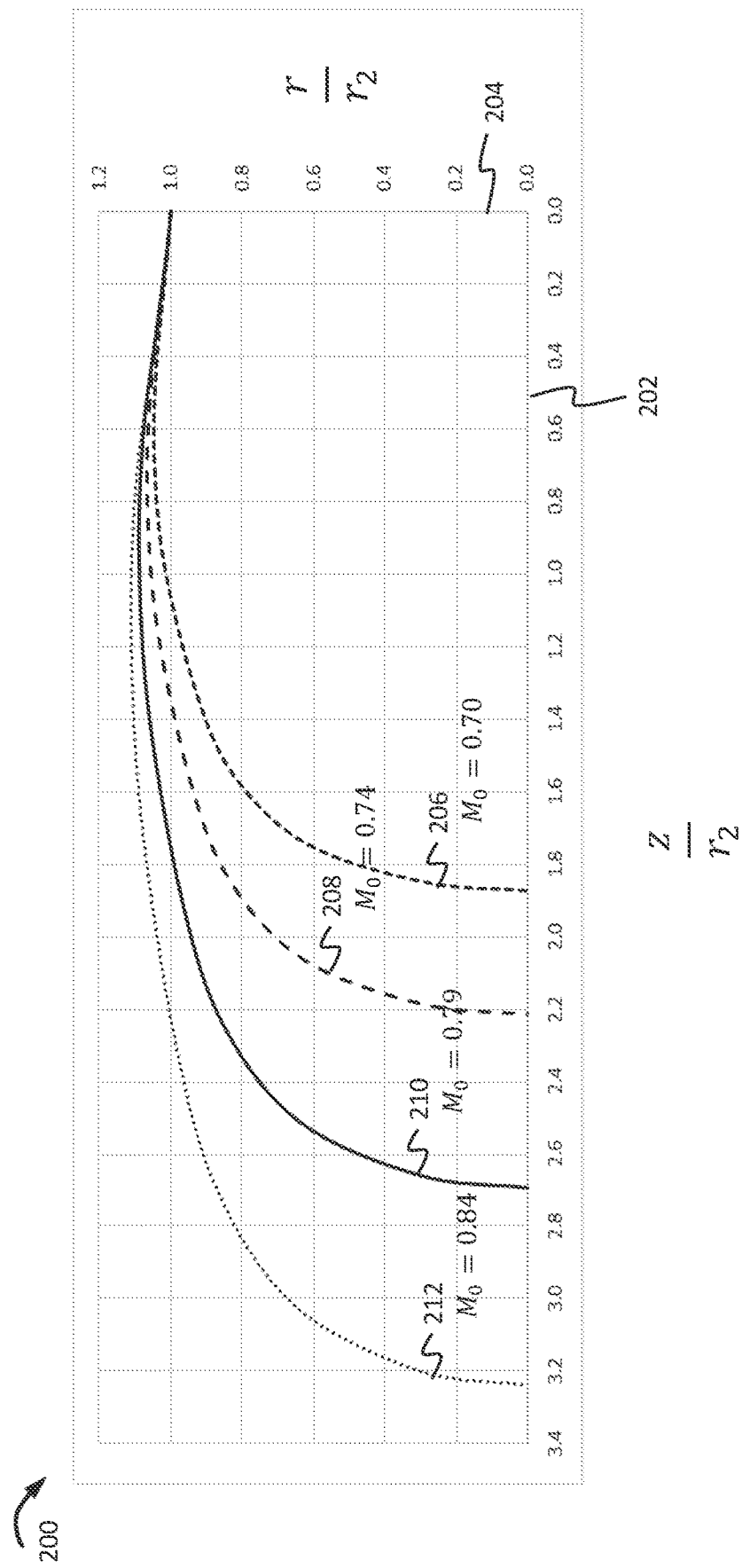
FIG. 11 is a chart 200 depicting shapes for a forward housing of an unducted propulsion system, according to some embodiments.

While the discussion of FIG. 10 describes an unducted propulsion system for propelling an aircraft consistent with the teachings herein, the discussion of FIG. 11 provides additional detail regarding a plot of values for geometries of a spinner for such an unducted propulsion system.

FIG. 11 is a chart 200 depicting external flowpath shapes for a spinner of an unducted propulsion system, according to some embodiments. The Y-Axis 204 represents the spinner radius normalized by the second radius 112, $r/r_2$, the second radius being at the local minimum within the axial extent of blades 102 nearest to the bulge having first radius 110. The X-Axis 202 represents the axial distance from the axial location of the second radius 112 (i.e., the local minimum) normalized by the second radius 112, $z/r_2$.

The chart 200 illustrates the forward housing or spinner 106 shape for different cruise Mach numbers, $M_0$. Specifically, the chart 200 includes a first plot 206, a second plot 208, a third plot 210, and a fourth plot 212. Each of the first plot 206, the second plot 208, the third plots 210, and the fourth plot 212 arise from the same values of A2=1.09, B2=0.98, and C2=2.69, but for a different cruise Mach number, $M_0$. The first plot 206 corresponds to $M_0$=0.70, the second plot 208 corresponds to $M_0$=0.74, the third plot 210 corresponds to $M_0$=0.79, and the fourth plot 212 corresponds to $M_0$=0.84. As can be seen from the chart 200, which depicts approximate shapes and relative sizes of the spinners, the ratio of the first radius to the second radius and the ratio of the second distance to the second ratio increase as the predetermined speed increases.

In addition to specifying the forward housing dimension ratios, further constraints on the shape of the flowpath curve are described herein. A superellipse equation below may provide a suitable distribution of curvature along the flowpath curve 105 to avoid excessive Mach number along the portion of the forward housing forward of the bulge. In specifying the shape of the spinner using the obtained $r_1$, $z_1$, and $z_2$, a superellipse expression provides optional bounds on the flowpath curve 105 forward of the bulge. EQ. 7 for a superellipse relating the axial coordinate, z, to the radius, r, is given below.

$$\left(\frac{z-z_1}{z_2-z_1}\right)^p + \left(\frac{r}{r_1}\right)^q = 1$$

or, equivalently, $$\left(\frac{z/r_2 - z_1/r_2}{z_2/r_2 - z_1/r_2}\right)^p + \left(\frac{r/r_2}{r_1/r_2}\right)^q = 1$$

Figure 12:
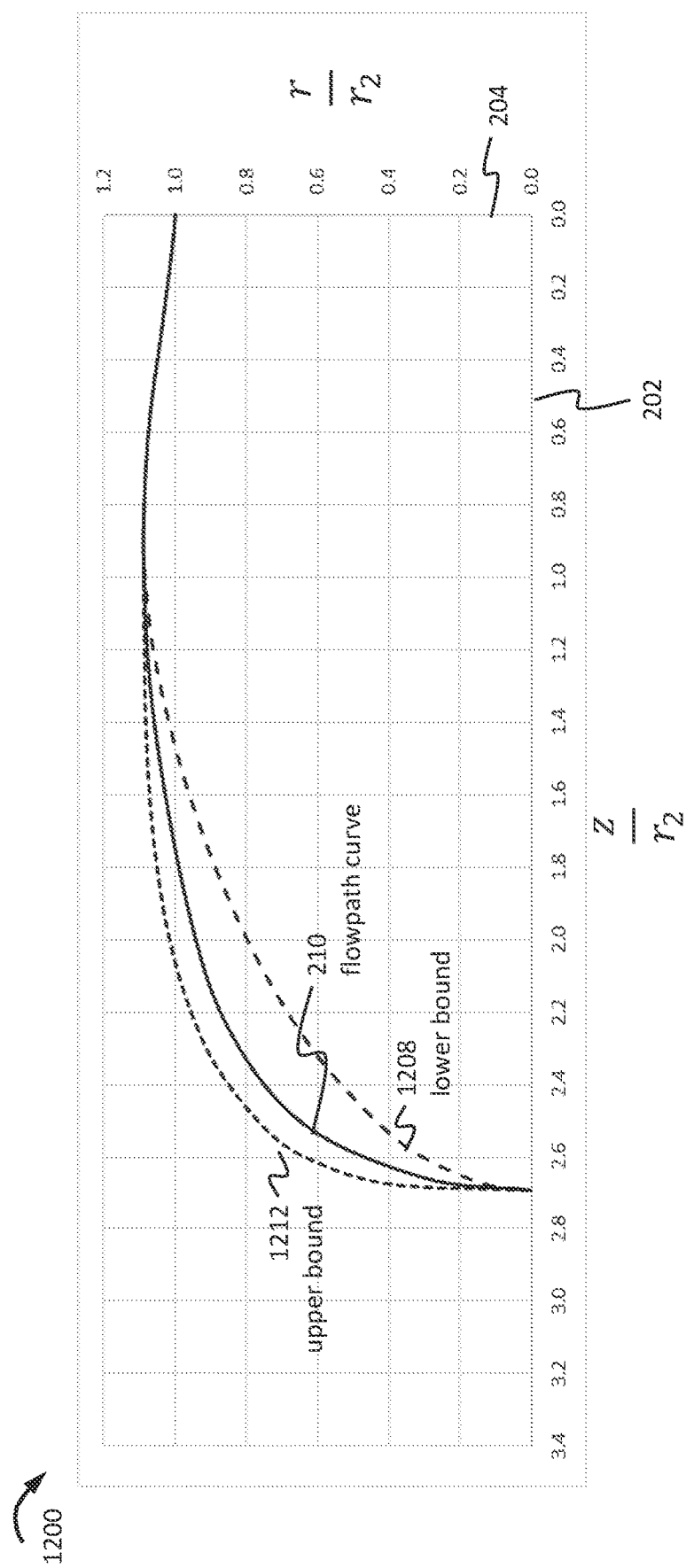
FIG. 12 is a chart 1200 depicting bounds on the shape of the forward housing of an unducted propulsion system, according to some embodiments.

In EQ. 7, exponents p and q define a shape of a curve forward of the bulge for ratios $r_1/r_2$, $z_1/r_2$, and $z_2/r_2$ determined via EQS. 4, 5, and 6 as described above. FIG. 12 provides chart 1200 similar to chart 200 in FIG. 11. Accordingly, X-Axis 202 and Y-Axis 204, and curve 210 in chart 1200 are the same as in chart 200. Curves 1208 and 1212 conform to the same ratios determined by EQS. 4, 5, and 6 as curve 210. However, curves 1208 and 1212 that bound the range of suitable points for flowpath curve 105 are determined by using EQ. 7 via values of exponents p and q. Curve 1208, with exponents p=1.5 and q=2.0, forms a lower bound on suitable points for flowpath curve 105 forward of the bulge. Curve 1212, with exponents p=3.0 and q=3.5 forms an upper bound of suitable points for flowpath curve 105 forward of the bulge. Thus, within the axial range from the bulge to the forward-most end 108 of the forward housing 106, EQ. 7 with ranges on exponents p and q provides a band, or range, of points to define the shape of forward housing 106. Curve 210 agrees closely with EQ. 7 using exponents p=2.0 and q=3.0. Thus, options for the lower bound conform to exponent ranges 1.5<p<2.0 and 2.0<q<3.0 while options for the upper bound conform to exponents ranges 2.0<p<3.0 and 3.0<q<3.5. At least for some cruise flight Mach numbers, $M_0$, for example 0.79 depicted as plot 210, a low loss flowpath curve can be obtained within a more limited bounds such that the lower constraints on the flowpath curve are in the ranges 1.7<p<2.0 and 2.5<q<3.0 while the upper constraints on the flowpath curve are in the ranges 2.0<p<2.5 and 3.0<q<3.3.

In some configurations, the above spinner shape parameters associated with the predetermined flight speed may be particularly beneficial when designing spinner shapes. The thrust parameter is the same as defined earlier:

$$\frac{F_{net}}{\rho_0 V_0^2 A_{an}}.$$

The thrust parameter may be, greater than or equal to 0.060, (e.g., greater than 0.080, or is greater than 0.084).

It should be recognized that the forward housing 106 or spinner need not be axisymmetric about the axis of rotation for the propeller. For example, at the axial location of the second radius proximal to the plurality of blades, the distance of the spinner or hub surface may vary in the circumferential direction to accommodate blade attachment or variable pitch mechanisms. As stated previously, for axial locations along forward housing 106 that are rotating about the axis of rotation 120, as the case with a spinner, the radius, such as the second radius, is defined as an "effective" radius of a circle having the same cross-sectional area of the spinner normal to the axis of rotation. Thus, the term "radius" used in the description and claims refers to the radius of a circle having the cross-sectional area of the spinner at that axial location. However, for a forward housing 106 that is stationary, as could be the case for an unducted propulsion system in which the forward blade assembly is stationary and the aft blade assembly is rotating, the flowpath curve 105 corresponds to the intersection of the forward housing with a plane that includes the axis of rotation and the forward-most point of the forward blade root 122. If the forward blade 102 has variable pitch, then the forward-most point corresponds to the blade orientation that positions the forward-most point in its most forward position, likely approximately to the cruise or design point condition. In this case, the flowpath curve 105 disclosed herein may correspond to one of the blade roots 122, more than one blade root, or all the blade roots. In case the forward-most point of the forward blade root 122 is not attached to the forward housing 106, e.g., there is a clearance gap between the forward blade root 122 and the forward housing 106 to allow for pitch change or the forward blade 102 is attached to the airframe and suspended over the forward housing 106, then curve 105 goes through the nearest point on the surface of the forward housing 106 to the forward-most point of the forward blade root 122.

In some embodiments, a rotating element for an unducted propulsion system for propelling an aircraft comprises a plurality of blades affixed to a spinner, wherein the spinner is configured to rotate about an axis of rotation, wherein the spinner includes a first radius and a second radius, wherein the second radius is proximal to the plurality of blades and the first radius is forward from the second radius, wherein a ratio of the first radius to the second radius ranges from 1.029 to 1.192, and wherein the aircraft is configured to travel at a predetermined speed.

Figure 13:
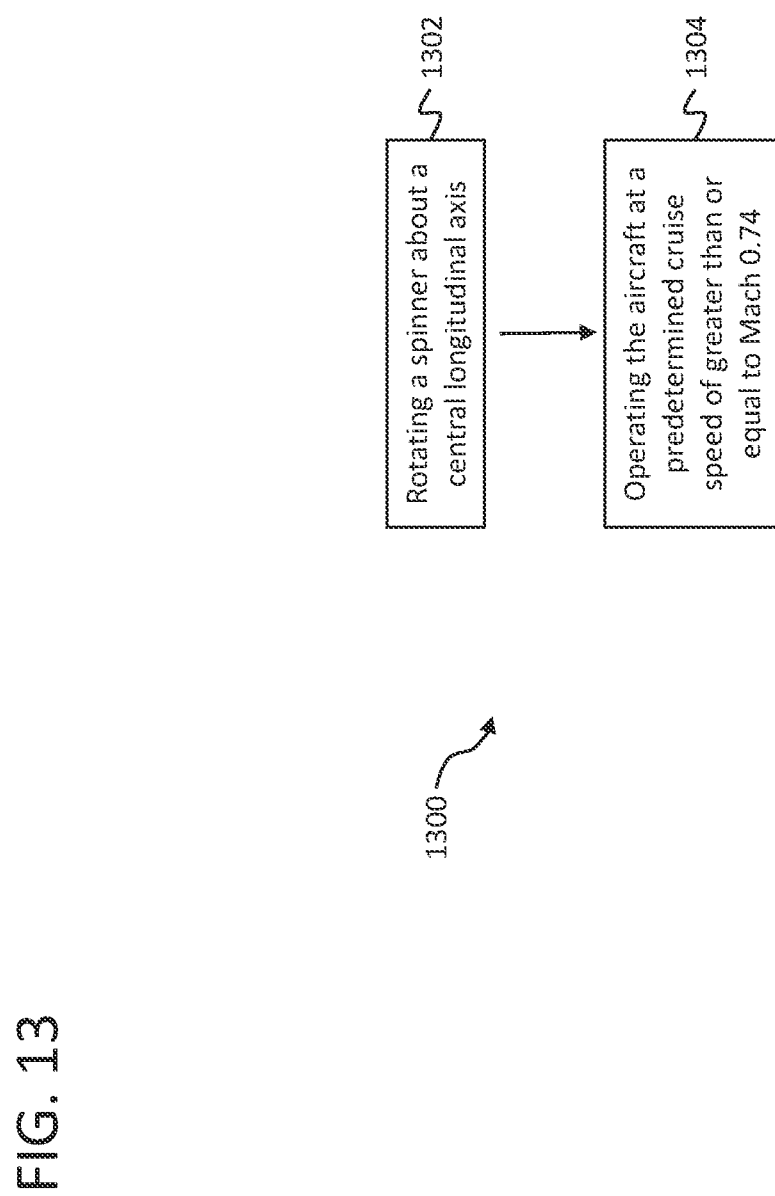
FIG. 13 is a flow chart of a method of operating an unducted propulsion system, according to some embodiments.

In some embodiments, a rotating element for an unducted propulsion system for propelling an aircraft comprises a plurality of blades affixed to a spinner, wherein the spinner is configured to rotate about an axis of rotation, wherein the flowpath curve on the spinner includes a first radius and a second radius, wherein the first radius is at the bulge or maximum radius forward of the associated plurality of blades, wherein the second radius is at the local minimum aft of the bulge, wherein a first distance is defined between the axial locations of the bulge and the local minimum, and wherein a second distance is defined between a forward-most end of the spinner and the axial location of the local minimum, wherein a ratio of the first radius to the second radius ranges from 1.029 to 1.192, wherein a ratio of the first distance to the second radius ranges from 0.641 to 1.522, wherein a ratio of the second distance to the second radius ranges from 1.800 to 4.115, wherein the aircraft is configured to travel at a predetermined speed. FIG. 13 is a flow chart of a method 1300 of operating an unducted propulsion system for propelling an aircraft. The unducted propulsion system includes a spinner and a plurality of blades affixed to the spinner. The method includes the steps of rotating 1302 the spinner about an axis of rotation and operating 1304 the aircraft at a predetermined speed of greater than or equal to Mach 0.74. The spinner may be configured as described herein with respect to FIGS. 1 and 2. For example, the spinner may include a first radius and a second radius, wherein the second radius is proximal to the plurality of blades and the first radius is forward from the second radius, wherein a ratio of the first radius to the second radius is greater than 1.029. Further, the ratio of the first radius to the second radius may be defined by EQ 4:

$$\frac{r_1}{r_2} = (A2 - 1)\frac{M_0 - 0.60}{0.19} + 1,$$

wherein $r_1$ is the first radius, $r_2$ is the second radius, $M_0$ corresponds to a predetermined sustained high speed of the aircraft (such as cruise), and A2 is a value that ranges from 1.04 to 1.14.

Also, a first distance is defined between the axial location corresponding to the first radius and the axial location corresponding to the second radius, and the ratio of the first distance to the second radius is less than 1.522. Further, the ratio of the first distance to the second radius may be defined by EQ. 5:

$$\frac{z_1}{r_2} = B2\left(\frac{M_0}{0.79}\right)^3$$

wherein $z_1$ is the first distance, $r_2$ is the second radius, $M_0$ corresponds to a predetermined sustained high speed of the aircraft (such as cruise), and B2 is a value that ranges from 0.78 to 1.18.

Also, a second distance is defined between the forward-most end of the spinner and the axial location corresponding to the second radius, and the ratio of the second distance to the second radius is less than 4.115. Further the ratio of the second distance to the second radius may be defined by EQ. 6:

$$\frac{z_2}{r_2} = C2\left(\frac{M_0}{0.79}\right)^3$$

wherein $z_2$ is the second distance, $r_2$ is the second radius, $M_0$ corresponds to a predetermined sustained high speed of the aircraft (such as cruise), and C2 is a value that ranges from 2.19 to 3.19.

An unducted propulsion system for an aircraft configured for high subsonic cruise comprising: an axis of rotation; a forward blade assembly comprised of a plurality of forward blades; an aft blade assembly comprised of a plurality of aft blades; a forward housing; an aft housing; wherein for each forward blade and each aft blade comprises a blade root proximal to the axis of rotation and a blade tip distal from the axis of rotation; wherein a flowpath curve corresponds to an intersection of the forward housing's external surface with a plane containing the axis of rotation and a forward-most point of a forward blade root; wherein for the flowpath curve, the axial direction, z, is parallel to the axis of rotation and radius, r, is a first distance from the axis of rotation; wherein a bulge location with radius $r_1$ on the flowpath curve is found by proceeding forward from the forward-most point on the forward blade root to where a first radius reaches a maximum; wherein a local minimum with radius $r_2$ on the flowpath curve is found by proceeding aft from the bulge location to a nearest point where a second radius stops decreasing within an axial extent of the forward blade root, and wherein ratio $r_1/r_2 > 1.029$.

The unducted propulsion system of any preceding clause wherein an axial distance $z_1$ is between the bulge location and the local minimum, and wherein ratio $z_1/r_2 < 1.522$.

The unducted propulsion system of any preceding clause wherein an axial distance $z_2$ is between a forward-most end of the forward housing and the local minimum, and wherein ratio $z_2/r_2 < 4.115$.

The unducted propulsion system of any preceding clause wherein the aircraft is configured for cruise flight Mach number $0.74 < M_0 < 0.86$, and wherein $$\frac{r_1}{r_2} = (A2 - 1)\frac{M_0 - 0.60}{0.19} + 1,$$

where $1.04 < A2 < 1.14$.

The unducted propulsion system of any preceding clause wherein $$\frac{z_1}{r_2} = B2\left(\frac{M_0}{0.79}\right)^3,$$

where $0.78 < B2 < 1.18$.

The unducted propulsion system of any preceding clause wherein $$\frac{z_2}{r_2} = C2\left(\frac{M_0}{0.79}\right)^3,$$

where $2.19 < C2 < 3.19$.

The unducted propulsion system of any preceding clause wherein $1.06 < A2 < 1.14$.

The unducted propulsion system of any preceding clause wherein $0.78 < B2 < 1.08$.

The unducted propulsion system of any preceding clause wherein $2.19 < C2 < 2.99$.

The unducted propulsion system of any preceding clause wherein $1.06 < A2 < 1.12$.

The unducted propulsion system of any preceding clause wherein $0.88 < B2 < 1.08$.

The unducted propulsion system of any preceding clause wherein $2.39 < C2 < 2.99$.

The unducted propulsion system of any preceding clause wherein the aircraft is configured for dimensionless cruise thrust parameter, $$\frac{F_{net}}{\rho_0 V_0^2 A_{an}},$$

where at cruise operation:
(i) $F_{net}$ is fan net thrust,
(ii) $\rho_0$ is ambient air density,
(iii) $V_0$ is flight velocity,
(iv) $A_{an}$ is fan stream tube annular area entering a fan, and $$(v) \frac{F_{net}}{\rho_0 V_0^2 A_{an}} > 0.060.$$

The unducted propulsion system of any preceding clause wherein $$\frac{F_{net}}{\rho_0 V_0^2 A_{an}} > 0.080.$$

The unducted propulsion system of any preceding clause wherein the forward blade assembly and the forward housing are stationary, and wherein the aft blade assembly and a portion of the aft housing to which the plurality of aft blades are attached rotate about the axis of rotation.

The unducted propulsion system of any preceding clause wherein the flowpath curve further corresponds to respective forward-most points of two or more forward blade roots.

The unducted propulsion system of any preceding clause wherein the flowpath curve further corresponds to respective forward-most points of at least half of forward blade roots.

The unducted propulsion system of any preceding clause wherein the forward blade assembly and the forward housing rotate about the axis of rotation, wherein the aft blade assembly and a portion of the aft housing to which the plurality of aft blades are affixed rotate about the axis of rotation, and wherein a third radius at a given axial location for which the forward housing is rotating is an effective radius that is a fourth radius of a circle having the same cross-sectional area perpendicular to the axis of rotation at that axial location.

The unducted propulsion system of any preceding clause wherein the forward blade assembly and the forward housing rotate about the axis of rotation, wherein the aft blade assembly and the aft housing are stationary, and wherein a third radius at a given axial location for which the forward housing is rotating is an effective radius that is a fourth radius of a circle having the same cross-sectional area perpendicular to the axis of rotation at that axial location.

The unducted propulsion system of any preceding clause wherein a number of blades in the forward blade assembly is greater than 4, wherein a number of blades in the aft blade assembly is greater than 4, and wherein a ratio of the number of blades in the forward blade assembly to the number of blades in the aft blade assembly is between 2:5 and 2:1.

The unducted propulsion system of any preceding clause wherein the number of blades in the forward blade assembly is between 8 and 18.

The unducted propulsion system of any preceding clause wherein a difference between the number of blades in the forward blade assembly to the number of blades in the aft blade assembly is between 2 and −2.

The unducted propulsion system of any preceding clause wherein ratio $r_1/r_2 > 1.044$.

The unducted propulsion system of any preceding clause wherein an axial distance $z_1$ is between the bulge location and the local minimum, and wherein ratio $z_1/r_2 < 1.393$.

The unducted propulsion system of any preceding clause wherein an axial distance $z_2$ is between a forward-most end of the forward housing and the local minimum, and wherein ratio $z_2/r_2 < 3.857$.

The unducted propulsion system of any preceding clause wherein a span is a second distance between the blade root and the blade tip, wherein the plurality of forward blades in the forward blade assembly are oriented for cruise operation, wherein the plurality of forward blades in the forward blade assembly have a maximum axial width near mid-span, and wherein 0 to 40 percent of the maximum axial width is located forward of the forward-most point of forward blade roots.

The unducted propulsion system of any preceding clause wherein a flowpath curve (z, r) coordinate system has origin at axial location of the local minimum with axial coordinate, z, increasing in a forward direction, wherein a curve forward of bulge $(z > z_1)$ lies within lower and upper bounds defined by $$\left(\frac{z-z_1}{z_2-z_1}\right)^p + \left(\frac{r}{r_2}\right)^q = 1,$$

wherein a lower bound has exponents $1.5<21$ Z r p$<2.0$ and $2.0<q<3.0$, and wherein an upper bound has exponents $2.0<p<3.0$ and $3.0<q<3.5$.

The unducted propulsion system of any preceding clause wherein the lower bound has exponents $1.7<p<2.0$ and $2.3<q<3.0$, and wherein the upper bound has exponents $2.0<p<2.5$ and $3.0<q<3.3$.

An unducted propulsion system for an aircraft configured for high subsonic cruise comprising: an axis of rotation; a forward blade assembly comprised of a plurality of forward blades; a forward housing; wherein for each blade comprises a blade root proximal to the axis of rotation and a blade tip distal from the axis of rotation; wherein a flowpath curve corresponds to an intersection of the forward housing's external surface with a plane containing the axis of rotation and a forward-most point of a forward blade root; wherein for the flowpath curve, an axial direction, z, is parallel to the axis of rotation and radius, r, is a distance from the axis of rotation; wherein a bulge location with radius $r_1$ on the flowpath curve is found by proceeding forward from the forward-most point on the forward blade root to where a first radius reaches a maximum; wherein a local minimum with radius $r_2$ on the flowpath curve is found by proceeding aft from the bulge location to a nearest point where a second radius stops decreasing, and wherein ratio $r_1/r_2>1.066$.

The unducted propulsion system of any preceding clause wherein an axial distance $z_1$ is between the bulge location and the local minimum, and wherein ratio $z_1/r_2<1.522$.

The unducted propulsion system of any preceding clause wherein an axial distance $z_2$ is between a forward-most end of the forward housing and the local minimum, and wherein ratio $z_2/r_2<4.115$.

An unducted propulsion system for an aircraft configured for high subsonic cruise comprising: an axis of rotation; a forward blade assembly comprised of a plurality of forward blades; an aft blade assembly comprised of a plurality of aft blades; a forward housing; an aft housing; wherein each forward blade and each aft blade comprises a blade root proximal to the axis of rotation and a blade tip distal from the axis of rotation; wherein a flowpath curve corresponds to an intersection of the aft housing's external surface with a plane containing the axis of rotation and an aft-most point of an aft blade root; wherein for the flowpath curve, an axial direction, z, is parallel to the axis of rotation and radius, r, is distance from the axis of rotation; wherein a bulge location with radius $r_b$ on the flowpath curve is found by proceeding aft from the aft-most point on the aft blade root to where a first radius reaches a maximum; wherein a local minimum with radius $r_h$ on the flowpath curve is found by proceeding forward from the bulge location to a nearest point where a second radius stops decreasing within an axial extent of the aft blade root; and wherein ratio $r_b/r_h>1.081$.

The unducted propulsion system of any preceding clause, wherein an axial distance $z_b$ is between the bulge location and the local minimum, and wherein ratio $z_b/r_h<2.103$.

The unducted propulsion system of any preceding clause wherein a location with radius $r_m$ is axially halfway between the bulge location and the local minimum, and wherein ratio $$\frac{r_m/r_h - 1}{r_b/r_h - 1} > 0.59.$$

The unducted propulsion system of any preceding clause wherein the aircraft is configured for cruise flight Mach number $0.74<M_0<0.86$, and wherein $$\frac{r_b}{r_h} = (A1 - 1)\frac{M_0 - 0.60}{0.19} + 1,$$

where $1.11<A1<1.31$.

The unducted propulsion system of any preceding clause wherein $$\frac{z_b}{r_h} = B1\left(\frac{M_0}{0.79}\right)^3,$$

where $1.23<B1<1.63$.

The unducted propulsion system of any preceding clause wherein $$\frac{r_m/r_h - 1}{r_b/r_h - 1} = 0.59,$$

where $0.59<C1<0.79$.

The unducted propulsion system of any preceding clause wherein $1.16<A1<1.31$. The unducted propulsion system of any preceding clause wherein $1.23<B1<1.53$.

The unducted propulsion system of any preceding clause wherein $0.64<C1<0.79$.

The unducted propulsion system of any preceding clause wherein $1.16<A1<1.26$.

The unducted propulsion system of any preceding clause wherein $1.33<B1<1.53$.

The unducted propulsion system of any preceding clause wherein $0.64<C1<0.74$.

The unducted propulsion system of any preceding clause wherein the aircraft is configured for dimensionless cruise thrust parameter, $$\frac{F_{net}}{\rho_0 V_0^2 A_{an}},$$

where at cruise operation:
 (i) $F_{net}$ is fan net thrust,
 (ii) $\rho_0$ is ambient air density,
 (iii) $V_0$ is flight velocity,
 (iv) $A_{an}$ is fan stream tube annular area entering a fan; and $$\frac{F_{net}}{\rho_0 V_0^2 A_{an}} > 0.060. \qquad (v)$$

The unducted propulsion system of any preceding clause wherein $$\frac{F_{net}}{\rho_0 V_0^2 A_{an}} > 0.080.$$

The unducted propulsion system of any preceding clause wherein the forward blade assembly and the forward housing rotate about the axis of rotation, and wherein the aft blade assembly and the aft housing are stationary.

The unducted propulsion system of any preceding clause wherein the flowpath curve further corresponds to respective aft-most points of two or more aft blade roots.

The unducted propulsion system of any preceding clause wherein the flowpath curve further corresponds to respective aft-most points of at least half of the aft blade roots.

The unducted propulsion system of any preceding clause wherein the forward blade assembly and the forward housing rotate about the axis of rotation, wherein the aft blade assembly and a portion of the aft housing to which the plurality of aft blades are affixed rotate about the axis of rotation, and wherein a third radius at a given axial location for which the aft housing is rotating is an effective radius that is a fourth radius of a circle having the same cross-sectional area perpendicular to the axis of rotation at that axial location.

The unducted propulsion system of any preceding clause wherein the forward blade assembly and the forward housing are stationary, wherein the aft blade assembly and a portion of the aft housing to which the plurality of aft blades are affixed rotate about the axis of rotation, and wherein a third radius at a given axial location for which the aft housing is rotating is an effective radius that is a fourth radius of a circle having the same cross-sectional area perpendicular to the axis of rotation at that axial location.

The unducted propulsion system of any preceding clause wherein a number of blades in the forward blade assembly is greater than 4, wherein a number of blades in the aft blade assembly is greater than 4, and wherein a ratio of the number of blades in the forward blade assembly to the number of blades in the aft blade assembly is between 2:5 and 2:1.

The unducted propulsion system of any preceding clause wherein a number of blades in the forward blade assembly is between 8 and 18.

The unducted propulsion system of any preceding clause wherein a difference between the number of blades in the forward blade assembly to the number of blades in the aft blade assembly is between 2 and −2.

The unducted propulsion system of any preceding clause wherein ratio $r_t/r_h > 1.118$.

The unducted propulsion system of any preceding clause wherein axial distance $z_b$ is between the bulge location and the local minimum, and wherein ratio $z_b/r_h < 1.974$.

The unducted propulsion system of any preceding clause wherein a location with radius $r_m$ is axially halfway between the bulge location and the local minimum, and wherein ratio $$\frac{r_m/r_h - 1}{r_b/r_h - 1} > 0.64.$$

The unducted propulsion system of any preceding clause wherein ratio $r_t/r_h < 1.424$.

What is claimed is:

1. An unducted propulsion system for an aircraft configured for high subsonic cruise comprising:
   an axis of rotation;
   a forward blade assembly comprised of a plurality of forward blades;
   an aft blade assembly comprised of a plurality of aft blades;
   a forward housing;
   an aft housing;
   wherein for each forward blade and each aft blade comprises a blade root proximal to the axis of rotation and a blade tip distal from the axis of rotation;
   wherein a flowpath curve corresponds to an intersection of the forward housing's external surface with a plane containing the axis of rotation and a forward-most point of a forward blade root;
   wherein for the flowpath curve, an axial direction, z, is parallel to the axis of rotation and radius, r, is a first distance from the axis of rotation;
   wherein a bulge location with radius $r_1$ on the flowpath curve is found by proceeding forward from the forward-most point on the forward blade root to where a first radius reaches a maximum;
   wherein a local minimum with radius $r_2$ on the flowpath curve is found by proceeding aft from the bulge location to a nearest point where a second radius stops decreasing within an axial extent of the forward blade root, and
   wherein ratio $r_1/r_2 > 1.029$;
   wherein an axial distance $z_1$ is between the bulge location and the local minimum, and wherein ratio $z_1/r_2 < 1.522$; and
   wherein an axial distance $z_2$ is between a forward-most end of the forward housing and the local minimum, and where ratio $z_2/r_2 < 4.115$.

2. The unducted propulsion system of claim 1, wherein the aircraft is configured for cruise flight Mach number $0.74 < M_0 < 0.86$, and wherein $$\frac{r_1}{r_2} = (A2 - 1)\frac{M_0 - 0.60}{0.19} + 1,$$

, where $1.04 < A2 < 1.14$.

3. The unducted propulsion system of claim 2, wherein $$\frac{z_1}{r_2} = B2\left(\frac{M_0}{0.79}\right)^3,$$

where $0.78 < B2 < 1.18$.

4. The unducted propulsion system of claim 3, wherein $$\frac{z_2}{r_2} = C2\left(\frac{M_0}{0.79}\right)^3,$$

where $2.19 < C2 < 3.19$.

5. The unducted propulsion system of claim 4, wherein $1.06 < A2 < 1.14$.

6. The unducted propulsion system of claim 5, wherein $0.78 < B2 < 1.08$.

7. The unducted propulsion system of claim 6, wherein $2.19 < C2 < 2.99$.

8. The unducted propulsion system of claim 7, wherein $1.06 < A2 < 1.12$.

9. The unducted propulsion system of claim 8, wherein $0.88 < B2 < 1.08$.

10. The unducted propulsion system of claim 9, wherein $2.39 < C2 < 2.99$.

11. The unducted propulsion system of claim 4, wherein the aircraft is configured for dimensionless cruise thrust parameter, $$\frac{F_{net}}{\rho_0 V_0^2 A_{an}},$$

where at cruise operation
i. $F_{net}$ is fan net thrust,
ii. $\rho_0$ is ambient air density,
iii. $V_0$ is flight velocity,
iv. $A_{an}$ is fan stream tube annular area entering a fan, and
v.

$$\frac{F_{net}}{\rho_0 V_0^2 A_{an}} > 0.060.$$

12. The unducted propulsion system of claim 11, wherein $$\frac{F_{net}}{\rho_0 V_0^2 A_{an}} > 0.080.$$

13. The unducted propulsion system of claim 4, wherein the forward blade assembly and the forward housing are stationary, and wherein the aft blade assembly and a portion of the aft housing to which the plurality of aft blades are attached rotate about the axis of rotation.

14. The unducted propulsion system of claim 13, wherein the flowpath curve further corresponds to respective forward-most points of two or more forward blade roots.

15. The unducted propulsion system of claim 13, wherein the flowpath curve further corresponds to respective forward-most points of at least half of forward blade roots.

16. The unducted propulsion system of claim 4, wherein the forward blade assembly and the forward housing rotate about the axis of rotation, wherein the aft blade assembly and a portion of the aft housing to which the plurality of aft blades are affixed rotate about the axis of rotation, and wherein a third radius at a given axial location for which the forward housing is rotating is an effective radius that is a fourth radius of a circle having the same cross-sectional area perpendicular to the axis of rotation at that axial location.

17. The unducted propulsion system of claim 4, wherein the forward blade assembly and the forward housing rotate about the axis of rotation, wherein the aft blade assembly and the aft housing are stationary, and wherein a third radius at a given axial location for which the forward housing is rotating is an effective radius that is a fourth radius of a circle having the same cross-sectional area perpendicular to the axis of rotation at that axial location.

18. The unducted propulsion system of claim 4, wherein a number of blades in the forward blade assembly is greater than 4, wherein a number of blades in the aft blade assembly is greater than 4, and wherein a ratio of the number of blades in the forward blade assembly to the number of blades in the aft blade assembly is between 2:5 and 2:1.

19. The unducted propulsion system of claim 18, wherein the number of blades in the forward blade assembly is between 8 and 18.

20. The unducted propulsion system of claim 19, wherein a difference between the number of blades in the forward blade assembly to the number of blades in the aft blade assembly is between 2 and −2.

21. The unducted propulsion system of claim 1, wherein ratio $r_1/r_2 > 1.044$.

22. The unducted propulsion system of claim 21, wherein an axial distance $z_1$ is between the bulge location and the local minimum, and wherein ratio $z_1/r_2 < 1.393$.

23. The unducted propulsion system of claim 22, wherein an axial distance $z_2$ is between a forward-most end of the forward housing and the local minimum, and wherein ratio $z_2/r_2 < 3.857$.

24. The unducted propulsion system of claim 18, wherein a span is a second distance between the blade root and the blade tip, wherein the plurality of forward blades in the forward blade assembly are oriented for cruise operation, wherein the plurality of forward blades in the forward blade assembly have a maximum axial width near mid-span, and wherein 0 to 40 percent of the maximum axial width is located forward of the forward-most point of forward blade roots.

25. The unducted propulsion system of claim 4, wherein a flowpath curve (z, r) coordinate system has origin at axial location of the local minimum with axial coordinate, z, increasing in a forward direction, wherein a curve forward of bulge $(z > z_1)$ lies within lower and upper bounds defined by $$\left(\frac{z-z_1}{z_2-z_1}\right)^p + \left(\frac{r}{r_2}\right)^q = 1,$$

wherein a lower bound has exponents $1.5 < p < 2.0$ and $2.0 < q < 3.0$, and wherein an upper bound has exponents $2.0 < p < 3.0$ and $3.0 < q < 3.5$.

26. The unducted propulsion system of claim 25, wherein the lower bound has exponents $1.7 < p < 2.0$ and $2.3 < q < 3.0$, and wherein the upper bound has exponents $2.0 < p < 2.5$ and $3.0 < q < 3.3$.

27. An unducted propulsion system for an aircraft configured for high subsonic cruise comprising:
an axis of rotation;
a forward blade assembly comprised of a plurality of forward blades;
a forward housing;
wherein for each blade comprises a blade root proximal to the axis of rotation and a blade tip distal from the axis of rotation;
wherein a flowpath curve corresponds to an intersection of the forward housing's external surface with a plane containing the axis of rotation and a forward-most point of a forward blade root;
wherein for the flowpath curve, an axial direction, z, is parallel to the axis of rotation and radius, r, is a distance from the axis of rotation;
wherein a bulge location with radius $r_1$ on the flowpath curve is found by proceeding forward from the forward-most point on the forward blade root to where a first radius reaches a maximum;
wherein a local minimum with radius $r_2$ on the flowpath curve is found by proceeding aft from the bulge location to a nearest point where a second radius stops decreasing, and wherein ratio $r_1/r_2 > 1.066$;
wherein an axial distance $z_1$ is between the bulge location and the local minimum, and wherein ratio $z_1/r_2 < 1.522$; and
wherein an axial distance $z_2$ is between a forward-most end of the forward housing and the local minimum, and wherein ratio $z_2/r_2 < 4.115$.

* * * * *

UNITED STATES PATENT AND TRADEMARK OFFICE
CERTIFICATE OF CORRECTION

| | | |
|---|---|---|
| PATENT NO. | : 11,753,144 B2 | |
| APPLICATION NO. | : 17/503195 | |
| DATED | : September 12, 2023 | |
| INVENTOR(S) | : Tweedt et al. | |

It is certified that error appears in the above-identified patent and that said Letters Patent is hereby corrected as shown below:

On the Title Page

On Page 2, in Item (56), under "Other Publications", in Column 1, Line 12, delete "Flrxibililies" and insert -- Flexibilities --, therefor.

On Page 2, in Item (56), under "Other Publications", in Column 1, Line 12, delete "gas turbime" and insert -- geared gas turbine --, therefor.

On Page 2, in Item (56), under "Other Publications", in Column 2, Line 25, delete "FLuid" and insert -- Fluid --, therefor.

On Page 2, in Item (56), under "Other Publications", in Column 2, Line 26, delete "Fec." and insert -- Dec. --, therefor.

On Page 2, in Item (56), under "Other Publications", in Column 2, Line 27, delete "Eqqipped" and insert -- Equipped --, therefor.

On Page 2, in Item (56), under "Other Publications", in Column 2, Line 44, delete "Lical" and insert -- Local --, therefor.

On Page 2, in Item (56), under "Other Publications", in Column 2, Line 44, delete "Meassurements," and insert -- Measurements, --, therefor.

Signed and Sealed this
Twenty-fourth Day of October, 2023

Katherine Kelly Vidal
*Director of the United States Patent and Trademark Office*